US010983762B2

(12) United States Patent
Eberlein et al.

(10) Patent No.: US 10,983,762 B2
(45) Date of Patent: Apr. 20, 2021

(54) APPLICATION ASSESSMENT SYSTEM TO ACHIEVE INTERFACE DESIGN CONSISTENCY ACROSS MICRO SERVICES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 16/455,072

(22) Filed: Jun. 27, 2019

(65) Prior Publication Data

US 2020/0409668 A1    Dec. 31, 2020

(51) Int. Cl.
| | |
|---|---|
| G06F 8/35 | (2018.01) |
| G06N 20/00 | (2019.01) |
| G06F 8/38 | (2018.01) |
| G06F 11/34 | (2006.01) |
| G06N 3/08 | (2006.01) |

(52) U.S. Cl.
CPC .................. *G06F 8/35* (2013.01); *G06F 8/38* (2013.01); *G06F 11/3447* (2013.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,523,142 B2 | 4/2009 | Driesen et al. | |
| 7,571,426 B2 * | 8/2009 | Carroll, Jr. ................ | G06F 8/38 |
| | | | 717/104 |
| 7,657,575 B2 | 2/2010 | Eberlein et al. | |
| 7,720,992 B2 | 5/2010 | Brendle et al. | |
| 2,199,904 A1 | 6/2010 | Eberlein et al. | |
| 7,739,387 B2 | 6/2010 | Eberlein et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |

(Continued)

OTHER PUBLICATIONS

Choudhary et al., "X-PERT: Accurate Identification of Cross-Browser Issues in Web Applications," IEEE, 2013, 10pg. (Year: 2013).*

(Continued)

*Primary Examiner* — Ryan D. Coyer
(74) *Attorney, Agent, or Firm* — Fish & Richardson P.C.

(57) ABSTRACT

Methods and systems are used for achieving interface design consistency across micro services. As an example, a user interface (UI) training request including at least a set of reference objects is received, the set of reference objects including at least a set of reference UIs. A user interface behavior reference model (UIBRM) is trained to generate a trained UIBRM by analyzing reference UI displays rendered on a browser in response to interactions with the set of reference UIs. A UI displays assessment request including at least a set of development objects is received, the set of development objects including at least a set of development UIs. A UI displays assessment is performed to generate an assessment of development UI displays by comparing the trained UIBRM to the development UI displays rendered on the browser in response to interactions with at least a subset of the set of development UIs.

20 Claims, 6 Drawing Sheets

(56) References Cited

U.S. PATENT DOCUMENTS

| | | | |
|---|---|---|---|
| 8,225,303 B2 | 7/2012 | Wagner et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |
| 8,375,130 B2 | 2/2013 | Eberlein et al. | |
| 8,380,667 B2 | 2/2013 | Driesen | |
| 8,392,573 B2 | 3/2013 | Lehr et al. | |
| 8,402,086 B2 | 3/2013 | Driesen et al. | |
| 8,407,297 B2 | 3/2013 | Schmidt-Karaca et al. | |
| 8,434,060 B2 | 4/2013 | Driesen et al. | |
| 8,467,817 B2 | 6/2013 | Said et al. | |
| 8,479,187 B2 | 7/2013 | Driesen et al. | |
| 8,560,876 B2 | 10/2013 | Driesen et al. | |
| 8,572,369 B2 | 10/2013 | Schmidt-Karaca et al. | |
| 8,604,973 B2 | 12/2013 | Schmidt-Karaca et al. | |
| 8,612,406 B1 | 12/2013 | Said et al. | |
| 8,627,277 B2 * | 1/2014 | Mosher | G06F 8/38 717/109 |
| 8,631,406 B2 | 1/2014 | Driesen et al. | |
| 8,645,483 B2 | 2/2014 | Odenheimer et al. | |
| 8,706,772 B2 | 4/2014 | Hartig et al. | |
| 8,732,083 B2 | 5/2014 | Vasing et al. | |
| 8,751,573 B2 | 6/2014 | Said et al. | |
| 8,762,929 B2 | 6/2014 | Driesen | |
| 8,793,230 B2 | 7/2014 | Engelko et al. | |
| 8,805,986 B2 | 8/2014 | Driesen et al. | |
| 8,875,122 B2 | 10/2014 | Driesen et al. | |
| 8,880,486 B2 | 11/2014 | Driesen et al. | |
| 8,924,384 B2 | 12/2014 | Driesen et al. | |
| 8,972,934 B2 | 3/2015 | Driesen et al. | |
| 8,996,466 B2 | 3/2015 | Driesen | |
| 9,003,356 B2 | 4/2015 | Driesen et al. | |
| 9,009,105 B2 | 4/2015 | Hartig et al. | |
| 9,026,502 B2 | 5/2015 | Driesen et al. | |
| 9,031,910 B2 | 5/2015 | Driesen | |
| 9,032,406 B2 | 5/2015 | Eberlein | |
| 9,069,984 B2 | 6/2015 | Said et al. | |
| 9,077,717 B2 | 7/2015 | Said et al. | |
| 9,122,669 B2 | 9/2015 | Demant et al. | |
| 9,137,130 B2 | 9/2015 | Driesen et al. | |
| 9,182,979 B2 | 11/2015 | Odenheimer et al. | |
| 9,183,540 B2 | 11/2015 | Eberlein et al. | |
| 9,189,226 B2 | 11/2015 | Driesen et al. | |
| 9,223,985 B2 | 12/2015 | Eberlein et al. | |
| 9,229,707 B2 | 1/2016 | Borissov et al. | |
| 9,256,840 B2 | 2/2016 | Said et al. | |
| 9,262,763 B2 | 2/2016 | Peter et al. | |
| 9,274,757 B2 | 3/2016 | Said et al. | |
| 9,336,227 B2 | 5/2016 | Eberlein et al. | |
| 9,348,929 B2 | 5/2016 | Eberlein | |
| 9,354,860 B2 | 5/2016 | Eberlein et al. | |
| 9,354,871 B2 | 5/2016 | Eberlein et al. | |
| 9,361,093 B2 | 6/2016 | Meissner et al. | |
| 9,361,326 B2 | 6/2016 | Driesen et al. | |
| 9,367,199 B2 | 6/2016 | Klemenz et al. | |
| 9,372,685 B1 | 6/2016 | Luettge et al. | |
| 9,436,724 B2 | 9/2016 | Driesen et al. | |
| 9,471,659 B2 | 10/2016 | Driesen et al. | |
| 9,501,516 B2 | 11/2016 | Driesen | |
| 9,519,675 B2 | 12/2016 | Specht et al. | |
| 9,569,283 B2 | 2/2017 | Eberlein | |
| 9,632,802 B2 | 4/2017 | Said et al. | |
| 9,633,107 B2 | 4/2017 | Said et al. | |
| 9,639,448 B2 | 5/2017 | Gebhard et al. | |
| 9,652,214 B1 | 5/2017 | Eberlein | |
| 9,652,744 B2 | 5/2017 | Eberlein et al. | |
| 9,672,140 B1 | 6/2017 | Eberlein | |
| 9,678,740 B2 | 6/2017 | Heine et al. | |
| 9,703,554 B2 | 7/2017 | Eberlein et al. | |
| 9,720,994 B2 | 8/2017 | Driesen et al. | |
| 9,721,116 B2 | 8/2017 | Driesen et al. | |
| 9,740,476 B2 | 8/2017 | Eberlein et al. | |
| 9,767,424 B2 | 9/2017 | Biewald et al. | |
| 9,800,689 B2 | 10/2017 | Said et al. | |
| 9,836,299 B2 | 12/2017 | Eberlein et al. | |
| 9,854,045 B2 | 12/2017 | Said et al. | |
| 9,858,309 B2 | 1/2018 | Eberlein et al. | |
| 9,875,273 B2 | 1/2018 | Eberlein et al. | |
| 9,898,279 B2 | 2/2018 | Eberlein et al. | |
| 9,898,494 B2 | 2/2018 | Eberlein et al. | |
| 9,898,495 B2 | 2/2018 | Eberlein et al. | |
| 9,927,992 B2 | 3/2018 | Driesen et al. | |
| 10,013,337 B2 | 7/2018 | Eberlein et al. | |
| 10,025,568 B2 | 7/2018 | Mayer et al. | |
| 10,055,215 B2 | 8/2018 | Specht et al. | |
| 10,061,788 B2 | 8/2018 | Said et al. | |
| 10,083,061 B2 | 9/2018 | Odenheimer et al. | |
| 10,120,886 B2 | 11/2018 | Eberlein et al. | |
| 10,157,052 B2 | 12/2018 | Eberlein et al. | |
| 10,157,068 B2 | 12/2018 | Arians et al. | |
| 10,185,552 B2 | 1/2019 | Eberlein et al. | |
| 10,187,393 B2 | 1/2019 | Odenheimer et al. | |
| 10,191,733 B2 | 1/2019 | Driesen | |
| 10,230,708 B2 | 3/2019 | Eberlein | |
| 10,268,472 B2 | 4/2019 | Eberlein et al. | |
| 10,268,692 B2 | 4/2019 | Mayer et al. | |
| 10,270,743 B2 | 4/2019 | Eberlein | |
| 10,275,867 B1 | 4/2019 | Pathapati et al. | |
| 10,291,704 B2 | 5/2019 | Eberlein et al. | |
| 10,296,324 B2 | 5/2019 | Burkhardt et al. | |
| 10,298,591 B2 | 5/2019 | Eberlein et al. | |
| 10,303,665 B2 | 5/2019 | Engelko et al. | |
| 10,311,077 B2 | 6/2019 | Specht et al. | |
| 2003/0046401 A1 | 3/2003 | Abbott et al. | |
| 2004/0148586 A1* | 7/2004 | Gilboa | G06F 8/38 717/108 |
| 2006/0171405 A1 | 8/2006 | Brendle et al. | |
| 2007/0180432 A1* | 8/2007 | Gassner | G06F 9/06 717/136 |
| 2007/0185720 A1 | 8/2007 | Eberlein et al. | |
| 2007/0239800 A1 | 10/2007 | Eberlein | |
| 2008/0222248 A1 | 9/2008 | Eberlein et al. | |
| 2009/0106371 A1 | 4/2009 | Schmidt-Karaca et al. | |
| 2009/0106372 A1 | 4/2009 | Schmidt-Karaca et al. | |
| 2009/0150479 A1 | 6/2009 | Eberlein et al. | |
| 2009/0172110 A1 | 7/2009 | Eberlein et al. | |
| 2010/0161648 A1 | 6/2010 | Eberlein et al. | |
| 2011/0154445 A1 | 6/2011 | Schmidt-Karaca et al. | |
| 2012/0131543 A1* | 5/2012 | Sundararajan | G06F 8/38 717/104 |
| 2012/0136839 A1 | 5/2012 | Eberlein et al. | |
| 2012/0159435 A1 | 6/2012 | Driesen et al. | |
| 2012/0023125 A1 | 10/2012 | Driesen et al. | |
| 2013/0085810 A1 | 4/2013 | Driesen et al. | |
| 2013/0144945 A1 | 6/2013 | Said et al. | |
| 2013/0166415 A1 | 6/2013 | Odenheimer et al. | |
| 2013/0166416 A1 | 6/2013 | Eberlein | |
| 2013/0324201 A1 | 12/2013 | Eberlein et al. | |
| 2013/0325672 A1 | 12/2013 | Odenheimer et al. | |
| 2013/0339488 A1 | 12/2013 | Eberlein et al. | |
| 2014/0019429 A1 | 1/2014 | Driesen et al. | |
| 2014/0025441 A1 | 1/2014 | Eberlein et al. | |
| 2014/0047319 A1 | 2/2014 | Eberlein | |
| 2014/0117076 A1 | 5/2014 | Eberlein | |
| 2014/0149158 A1 | 5/2014 | Odenheimer et al. | |
| 2014/0156724 A1 | 6/2014 | Said et al. | |
| 2014/0164963 A1 | 6/2014 | Klemenz et al. | |
| 2014/0325069 A1 | 10/2014 | Odenheimer et al. | |
| 2015/0006608 A1 | 1/2015 | Eberlein et al. | |
| 2015/0188890 A1 | 7/2015 | Said et al. | |
| 2015/0220576 A1 | 8/2015 | Eberlein | |
| 2015/0220591 A1 | 8/2015 | Eberlein et al. | |
| 2015/0222665 A1 | 8/2015 | Eberlein et al. | |
| 2016/0026698 A1 | 1/2016 | Eberlein et al. | |
| 2016/0063050 A1 | 3/2016 | Schoen et al. | |
| 2016/0098253 A1 | 4/2016 | Hutzel et al. | |
| 2016/0127325 A1 | 5/2016 | Odenheimer et al. | |
| 2017/0103226 A1 | 4/2017 | Eberlein et al. | |
| 2017/0116296 A1 | 4/2017 | Specht et al. | |
| 2017/0161291 A1 | 6/2017 | Specht et al. | |
| 2017/0161511 A1 | 6/2017 | Eberlein et al. | |
| 2017/0286467 A1 | 10/2017 | Eberlein et al. | |
| 2017/0329505 A1 | 11/2017 | Richter et al. | |

(56) References Cited

U.S. PATENT DOCUMENTS

| | | |
|---|---|---|
| 2017/0344362 A1 | 11/2017 | Burkhardt et al. |
| 2017/0351442 A1 | 12/2017 | Specht et al. |
| 2018/0041568 A1 | 2/2018 | Eberlein |
| 2018/0081668 A1 | 3/2018 | Eberlein |
| 2018/0095953 A1 | 4/2018 | Mayer et al. |
| 2018/0129676 A1 | 5/2018 | Eberlein et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0144117 A1 | 5/2018 | Engler et al. |
| 2018/0146056 A1 | 5/2018 | Eberlein |
| 2018/0197103 A1 | 7/2018 | Petursson |
| 2018/0210709 A1 | 7/2018 | Bharthulwar |
| 2018/0268154 A1 | 9/2018 | Specht et al. |
| 2018/0285097 A1 | 10/2018 | Radermacher et al. |
| 2018/0285390 A1 | 10/2018 | Mayer et al. |
| 2018/0300332 A1 | 10/2018 | Odenheimer et al. |
| 2018/0316685 A1 | 11/2018 | Eberlein et al. |
| 2018/0316772 A1 | 11/2018 | Eberlein et al. |
| 2018/0329930 A1 | 11/2018 | Eberlein et al. |
| 2018/0331927 A1 | 11/2018 | Eberlein et al. |
| 2018/0336365 A1 | 11/2018 | Eberlein et al. |
| 2019/0007420 A1 | 1/2019 | Eberlein et al. |
| 2019/0018874 A1 | 1/2019 | Eberlein et al. |
| 2019/0034460 A1 | 1/2019 | Eberlein |
| 2019/0129985 A1 | 5/2019 | Schlarb et al. |
| 2019/0129986 A1 | 5/2019 | Birn et al. |
| 2019/0129988 A1 | 5/2019 | Auer et al. |
| 2019/0129990 A1 | 5/2019 | Schlarb et al. |
| 2019/0129991 A1 | 5/2019 | Auer et al. |
| 2019/0129997 A1 | 5/2019 | Auer et al. |
| 2019/0130010 A1 | 5/2019 | Auer et al. |
| 2019/0130121 A1 | 5/2019 | Bim et al. |
| 2019/0166209 A1 | 5/2019 | Mueller et al. |
| 2019/0196932 A1* | 6/2019 | Adika .................. G06F 3/0482 |

OTHER PUBLICATIONS

Moran et al., "Automated Reporting of GUI Design Violations for Mobile Apps," IEEE, 2018, 11 pg. (Year: 2018).*
Paiva et al., "A Model-to-implementation Mapping Tool for Automated Model-based GUI Testing," ICFEM, 2005, 15pg. (Year: 2005).*
U.S. Appl. No. 15/847,627, filed Dec. 19, 2017, Boer et al.
U.S. Appl. No. 15/874,317, filed Jan. 18, 2018, Eberlein et al.
U.S. Appl. No. 15/883,680, filed Jan. 30, 2018, Eberlein.
U.S. Appl. No. 15/970,499, filed May 3, 2018, Eberlein et al.
U.S. Appl. No. 15/983,469, filed May 18, 2018, Driesen et al.
U.S. Appl. No. 15/983,812, filed May 18, 2018, Eberlein et al.
U.S. Appl. No. 15/996,806, filed Jun. 4, 2018, Hauck et al.
U.S. Appl. No. 16/005,927, filed Jun. 12, 2018, Kruempelmann et al.
U.S. Appl. No. 16/173,225, filed Oct. 29, 201, Eberlein et al.
U.S. Appl. No. 16/200,427, filed Nov. 26, 2018, Mueller et al.
U.S. Appl. No. 16/208,920, filed Dec. 4, 2018, Eberlein et al.
U.S. Appl. No. 16/214,724, filed Dec. 10, 2018, Eberlein et al.
U.S. Appl. No. 16/219,358, filed Dec. 13, 2018, Eberlein et al.
U.S. Appl. No. 16/219,371, filed Dec. 13, 2018, Eberlein et al.
U.S. Appl. No. 16/219,375, filed Dec. 13, 2018, Eberlein.
U.S. Appl. No. 16/297,057, filed Mar. 8, 2019, Eberlein.
U.S. Appl. No. 16/402,453, filed May 3, 2019, Eberlein.
U.S. Appl. No. 16/410,076, filed May 13, 2019, Eberlein et al.
Demis Hassabis, "Public Lecture with Google DeepMind's Demis Hassabis" Presented at Google DeepMinds on Nov. 19, 2015, retrieved on Jun. 25, 2019, https://www.youtube.com/watch?v=0X-NdPtFKq0&feature=youtu.be, 1 page (Video submission).
Hassan et al., "Extraction and Classification of User Interface Components from an Image" International Journal of Pure and Applied Mathematics 118.24, May 25, 2018, 16 pages.
Medium.com: Towards Data Science, "The 5 Clustering Algorithms Data Scientists Need to Know," Feb. 5, 2018, [retrieved on Jun. 14, 2019], retrieved from: URL < https://towardsdatascience.com/the-5-clustering-algorithms-data-scientists-need-to-know-a36d136ef68>, 9 pages.
Opencv.org, "OpenCV @ CVPR 2019" OpenCV home page, Jun. 17, 2019, [Retrieved on Jun. 28, 2019], retrieved from: URL <https://opencv.org/>, 6 pages.
Scikit-learn.org, "Modules Clustering," May 14, 2019, [retrieved on Jun. 14, 2019], retrieved from: URL < Clustering https://scikit-learn.org/stable/modules/clustering.html#clustering>, 33 pages.
Sikulix.com "Sikulix by Raiman" Jan. 1, 2017, [retrieved on Jun. 27, 2019], retrieved from: URL <http://sikulix.com/>, 6 pages.
Wikipedia Contributors, "Object detection", available on or before Dec. 21, 2018, via internet Archive: Wayback Machine URL <http://web.archive.org/web/20181221101600/https://en.wikipedia.org/wiki/Object_detection>, [Retrieved on Jun. 14, 2019]. retrieved from URL <https://en.wikipedia.org/wiki/Object_detection>, 2 pages.
Wikipedia Contributors, "Outline of object recognition", available on or before May 8, 2019 via internet Archive: Wayback Machine URL <http://web.archive.org/web/20190508105558/https://en.wikipedia.org/wiki/Outline_of_object_recognition>, [Retrieved on Jun. 28, 2019]. retrieved from URL <https://en.wikipedia.org/wiki/Outline_of_object_recognition>, 7 pages.
Yun et al., "Detection of GUI Elements on Sketch Images Using Object Detector Based on Deep Neural Networks." International Conference on Green and Human Information Technology. Springer, Singapore, Jan. 31, 2018, 5 pages.
Extended European Search Report issued in European Application No. 20165459.7 dated Sep. 28, 2020, 14 pages.
Shippon, "BackstopJS Readme" Jun. 2019, [retrieved on Sep. 3, 2020], Retrieved from: URL <https://github.com/garris/BackstopJS/tree/fcd3325d1bdb756cabdce681df0af8789256777a>, 30 pages.

* cited by examiner

APPLICATION ASSESSMENT SYSTEM TO ACHIEVE INTERFACE DESIGN CONSISTENCY ACROSS MICRO SERVICES

BACKGROUND

In a micro-services-based architecture, an application (for example, a distributed application) can be structured as a collection of coupled services, which may enable parallel development efforts for each respective service. For applications having a broad scope and a large number of interfaces (for example, application programming interfaces (APIs) and user interface (UI) display), development is typically distributed to multiple teams, which may include teams from the same organization, teams in different organizations, teams in different companies, or teams in third-party organizations. Application consumers expect at least homogeneous UIs and a consistent set of APIs across an entire application. For an application, it can no longer be assumed that only a single UI library having the same guidelines, widget set, and re-usable stylesheets can be utilized for the application to provide a homogenous user experience. In order to meet the application consumer's expectations, consistency guidelines need to be developed and checked. This is typically accomplished by manually checking the consistency guidelines.

SUMMARY

The present disclosure describes consistency assessment system for achieving interface design consistency across micro services.

In an implementation, a computer-implemented method for achieving interface design consistency across micro services. A user interface (UI) training request including at least a set of reference objects associated with a reference application is received, by a consistency assessment infrastructure (CAI), the set of reference objects including at least reference code including a set of reference UIs. A user interface behavior reference model (UIBRM) is trained, by the CAI, to generate a trained UIBRM by analyzing reference UI displays rendered on a browser by the reference application in response to interactions with the set of reference UIs. A UI displays assessment request including at least a set of development objects associated with a development application is received, by the CAI, the set of development objects including at least development code including a set of development UIs. A UI displays assessment is performed, by the CAI, to generate an assessment of development UI displays by comparing the trained UIBRM to the development UI displays rendered on the browser by the development application in response to interactions with at least a subset of the set of development UIs. The assessment of development UI displays is sent, by the CAI, to a client system.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, to achieve interface design consistency across micro services, only reference objects including reference code, reference application programming interfaces (APIs), and reference UIs associated with at least one reference application need to be developed or selected from best practice objects for development objects and associated development applications to be assessed for consistency, which minimizes or eliminates the need to rely on writing guidelines and/or human control of guidelines. Second, by training and utilizing a UIBRM and a code reference model (CRM) using at least one machine learning algorithm to compare newly developed code against best practice reference objects and return a deviation score and deviation information, enables a consistency verification to be added into a continuous integration pipeline development process and extends code checks to homogenous user experience questions.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
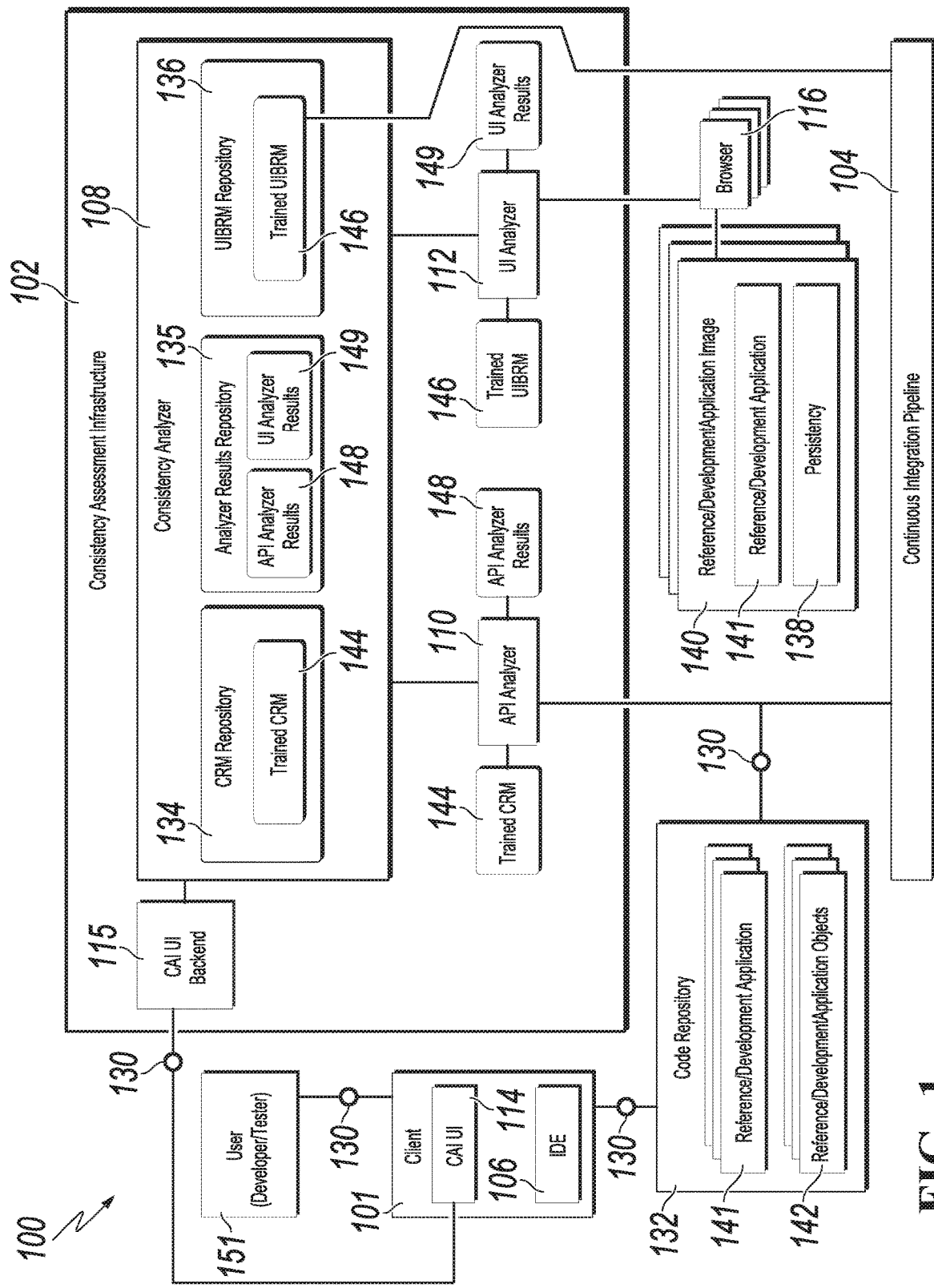
FIG. 1 is a block diagram illustrating an example application assessment system (AAS) computing system for achieving interface design consistency cross micro services, according to an implementation of the present disclosure.

The following detailed description describes an application assessment system (AAS) for achieving interface design consistency across micro services, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

For the purposes of this disclosure, a typical application (for example, a distributed scientific, educational, financial, or recreational application) can be based on a micro-services architecture and be structured as a collection of coupled services, which may enable parallel development efforts for each respective service. For applications with a broad scope and a large number of interfaces (for example, application programming interfaces (API) and user interface (UI) display (or display)), development is typically distributed to multiple teams, which may include teams from the same organization, teams in different organizations, teams in different companies, or teams in third-party organizations. A large team of distributed developers may utilize heterogeneous technology, languages, and libraries in the development of a distributed application. Application consumers expect at least homogeneous UIs and consistent code and APIs across an entire application. A new set of APIs may be created for an application and this new set of APIs may be utilized to extend the application or to embed it into another solution scenario. When the characteristics associated with the new set of APIs are heterogeneous and inconsistent, efforts to extend the application or to embed it into another solution scenario may be difficult or not even possible. For an application, it can no longer be assumed that only a single UI library having the same guidelines, widget set, and re-usable stylesheets can be utilized for the application to provide a homogenous user experience.

In a typical approach, in order to develop an application to meet a consumer's expectations, consistency guidelines need to be developed and checked. This is typically accomplished by manually checking the consistency guidelines. In cases where certain characteristics of an application cannot be specified by one mechanism, such as whether a color palette or a font in a style sheet is consistently used throughout the application, these characteristics need to be manually checked during testing of the application. This activity can be cumbersome, error prone, and may add significantly to the cost of testing. In other cases, particular characteristics may not be able to be defined by content or code, for example, balancing a number of items on UI displays or whether actions are available on widgets (such as, sorting in a table). These characteristics will also need to be manually checked during testing.

Testing for consistency is fundamentally a manual process and partly depends on an assessment based on experience, traditionally the experience of human testers, where the testers' experience levels and biases may impact the quality of their assessment. Even when multiple different testers are utilized for consistency assessments for different parts of the application, these manual assessments may still overlook inconsistencies.

When guidelines are to be utilized for consistency checking across the application, the guidelines need to be documented, complete, and unambiguous, as the guidelines may be interpreted by different designers, developers, and testers. Any ambiguity in the guidelines or cause of different interpretations or understanding may result in increased inconsistencies in UIs and APIs across the distributed application.

In contrast to typical manual checking for consistency across an application, an AAS for achieving interface design consistency across micro services is disclosed herein. The AAS can guide teams of developers to create a consistent user experience of all interfaces, including UIs, APIs, and other types of interfaces. For example, in order to provide a homogenous user experience in an application, APIs need to be consistent (for example, in definition and naming) and UIs also need to be consistent (for example, in visual, navigation, accessibility, browser, generic capabilities, and customization support and characteristics). The AAS is based on reference applications created along desired guidelines (for example, the same or similar color palette, fonts used, display layout, accessibility features, and API qualities), which developers may utilize to understand the homogeneous user experience. A consistency assessment infrastructure (CAI) of the AAS may be trained on the reference applications' UIs and APIs. When a newly created application, or an extension, is developed, the newly created code may be provided to the CAI to compare the new code UIs and APIs against the reference applications' UIs and APIs to assess similarity. The new application may then be deployed and started. The CAI may read the rendered UIs and may assess similarity of the application reaction to input actions, such as, a mouse action, a keyboard action, or a touch action, of the new application compared to the reference applications' behavior. While assessing similarity, the CAI may generate assessment results including a list of deviations and homogeneity assessment levels for the APIs and the UIs. The CAI may provide the assessment results to the developer. For each deviation of the list of deviations that has a low homogeneity assessment level, the CAI may also provide the respective code reference or UI reference to the developers. Based on the assessment results including the list of deviations and the homogeneity assessment levels, developers may adjust the new code APIs and UIs to achieve a high homogeneity assessment level. When the developers then create or update the new application's APIs and UIs and the AAS indicates only a minimal or no deviation from the reference applications, the user experience of all the interfaces across the new application will be much more consistent and homogeneous.

The AAS allows a large team of distributed developers to utilize heterogeneous technology, languages, and libraries to create a distributed application with a homogeneous user experience. By assessing the deviation from a selected standard based on best practice reference applications and providing the assessments to the developers, the AAS may achieve consistency in design of interfaces across micro services without the need to develop and enforce a well-defined set of rules. The AAS and method may significantly reduce or eliminate the need to manually check for consistency during testing, which may lead to a corresponding reduction in the size of test and quality assessment teams and the associated costs.

FIG. 1 is a block diagram illustrating an example AAS 100 computing system for achieving interface design consistency cross micro services, according to an implementation of the present disclosure. At a high level, the illustrated AAS 100 includes or is made up of one or more communicably coupled computers (for example, see FIG. 6) that communicate across a network 130 operating within a cloud-computing-based environment. The illustrated AAS 100 includes a client 101, a CAI 102, a continuous integration pipeline (CIP) 104, a code repository 132, a plurality of browsers 116, and a user 151 (also referred herein as a designer, a developer, a tester, or a quality assurance specialist). The illustrated client 101 includes a consistency assessment infrastructure user interface (CAI UI) 114 and an integrated development environment (IDE) 106. The illustrated CAI 102 includes a consistency analyzer 108, an API analyzer 110, a UI analyzer 112, and a CAI UI backend 115. The illustrated consistency analyzer 108 includes a code reference model (CRM) repository 134, an analyzer results repository 135, and a user interface behavior reference model (UIBRM) repository 136. Although the detailed description is focused on consistency assessment functionality, other functionality is envisioned to be covered by the described subject matter. Discussion of consistency assessment functionality is not intended to limit the detailed description to only consistency assessment functionality or to limit the detailed description in any way.

The AAS 100 is based on reference applications (such as, one or more reference applications 141 stored at the code repository 132), which are created with desired guidelines and with consistent characteristics (such as, the same color palettes, fonts used, display layout, accessibility features, API qualities, and other UI, API, and code characteristics). In the AAS 100, the desired guidelines/consistent characteristics may be described in at least one or more sets of reference objects (such as, one or more sets of reference application objects 142 stored at code repository 132). The one or more sets of reference application objects 142 may be associated with the one or more reference applications 141. Each set of the one or more sets of reference objects 142 may include at least one of reference code, a set of reference API definitions, a set of reference UI definitions, and other types of reference objects or information.

UI Features and Characteristics

A set of reference or development UI definitions may include at least visual, navigation, accessibility, browser, generic capabilities, customization support and characteristics, and other types of support and characteristics. The disclosure describes an example set of reference or development UI definitions in further detail.

Visual appearance characteristics of UI displays may include color palettes, font usage (for example, Arial, Calibri, and Courier New), shapes of widgets (for example, buttons with rectangular shape or with rounded corners), indentation usage (for example, two characters, tabs, 20 pixels), display layout (for example, is a "logout" button always located at a fixed position—top right of a display, a "back" button left of a "next" button), and display balance (for example, are similar number of elements on each display belonging to application—two input fields on one display and 200 on another display).

Navigation support and characteristics of UIs may include navigation availability (for example, are navigation mechanisms available on all UI displays—a back button, an OK button, a cancel-button, a help button, a save button, a save draft button, a logout button) and naming (for example, are navigation mechanisms named consistently on all UI displays—"OK", "Continue", "Next", or "Shutdown").

Accessibility support and characteristics of UIs may include display accessibility support (for example, do all displays provide accessibility support), display accessibility fields (for example, do all fields have accessibility information and is this information consistent—terminology, amount of text per element), field navigation (for example, are all fields reached by a consistent tab sequence with the last elements "cancel" and "ok" in this order), field tab sequence (for example, is the tab sequence consistent—fields in a table always from left to right), color palette (for example, is there a high-contrast color palette on all displays and is the appearance of the result of this representation consistent).

Browser support and characteristics of UIs may include display browser support (for example, is a consistent set of browsers supported on all displays, do some displays only support Safari while others only support Chrome?), display device support (for example, do all displays support browsers on a consistent set of device displays—do some displays only offer support for tablet and mobile displays while others only support browsers on large display displays), and display browser and device support (for example, do all displays support a given list of browsers including browser versions and devices). When browser support across UI displays is inconsistent, the usage of the distributed application may be limited or not even possible.

Generic capabilities support and characteristics of UIs may include whether generic capabilities for display elements of UI displays are provided consistently throughout the distributed application support. For example, for tables provided on UI displays, are columns hide-able, are column widths changeable, or can a table be sorted on columns. Are generic capabilities provided consistently for tables, for example, are filtering and sorting capabilities always presented on the right end of the field and annotated with a triangle indicating the sort order?

Customization support and characteristics of UIs may include whether personalization is consistently used across the application. For example, if a "high contrast mode" is selected, is it used on all UI displays or does it need to be selected on one or more other displays? If default values may be specified for fields of UI displays (for example, a material number), are these default values used across all UI displays using the same respective fields (the material number)?

API Characteristics

A set of reference or development API definitions may include at least definition, naming, and other types of API characteristics. The following describes the set of reference or development API definitions in further detail.

Definition characteristics for an API may include whether the protocol is an open data protocol (OData) or a representational state transfer (REST) protocol, whether authentication is username and password, open authentication (OAuth) with a Java script web token (JWT) or an Opaque token, or security service markup language (SAML), whether the definition and request and response payloads are formatted with Java script object notation (JSON) or extensible markup language (XML), whether the JSON or XML formatting is balanced (for example, having a similar depth of entries), whether the tenant information is in a header, a payload, or in a JWT, whether the API provides paging support or not on return sets (for example, can paging support be specified, number of rows <n> shall be returned per page, like: 1-to-n, n+1-to-2*n, 2n+1-to-3n, . . . ).

Naming characteristics for an API may include whether key fields have the same names for the same content (for example, is the key "tenant", "sub-account", "customer", "customer-ID", or "client"), whether terminology is defined, whether defined terminology is followed, whether data types of fields with the same name identical (for example, a material number is a string, a 40 maximum character field, or an integer), whether names use a common type-formatting (for example, CamelCase, separation_by_underscores, lowercase, or UPPERCASE), and whether translation is complete for all fields or is a default language used during development for some or all fields (for example, English). Naming characteristics for a UI may be the same or similar as the naming characteristics for an API.

The one or more sets of reference application objects 142 may be associated with the one or more reference applications 141. Each set of the one or more sets of reference objects 142 may include at least one of reference code, a set of reference API definitions, a set of reference UI definitions, or another type of reference object, or reference information.

The CAI 102 may use the one or more reference applications 141 and the associated one or more sets of reference objects 142 to create a trained CRM 144 using the consistency analyzer 108 and the API analyzer 110 and a trained UIBRM 146 using the consistency analyzer 108 and the UI analyzer 112. When a new development application is created, such as, a development application 141 and stored at the code repository 132, the development application 141 and an associated set of development objects, such as, a set of development objects 142 may be provided to the consistency analyzer 108, the API analyzer 110, and the UI analyzer 112 for assessment against the trained CRM 144 and the trained UIBRM 146 trained on the one or more reference applications 141 and the one or more sets of reference application objects 142. The set of development objects 142 may include at least one of development code, a set of development API definitions, a set of development UI definitions, or another type of development object, or development information. The API analyzer 110 may compare the development code APIs and UIs against the trained CRM 144 trained on the one or more reference applications' APIs and UIs to assess similarity and generate API analyzer results 148. The development application 141 may then be deployed and started by the CIP 104. The UI analyzer 112 may read the rendered UIs and may assess the similarity of the application reaction to user input actions (also referred herein as events) (such as, a mouse action, a keyboard action, or a touch action) of the development application 141 compared to the one or more reference applications 141 behavior using the trained UIBRM 146 and generate UI analyzer results 149. The CAI 102 assesses deviations in the development APIs and UI behaviors of the development application 141 from a selected standard based on the one or more reference applications 141, the trained CRM 144, and the trained UIBRM 146. Based on the assessments of the development code APIs and UIs and the development applications' 141 behavior against the one or more reference applications 141, the API analyzer results 148 and the UI analyzer results 149, respectively, the CAI 102 generates a behavior assessment report including a list of deviations and a homogeneity assessment level. When the assessment results indicate that the deviation between one or more of the development applications' APIs and UIs of the development application 141 and the corresponding one or more reference applications' APIs exceeds a deviation limit, the CAI 102 may also create a more detailed assessment report including one or more respective code references or one or more respective UI references. In some implementations, the CAI 102 can provide these assessment reports to the developers. Based on these reports including the list of deviations and the generated homogeneity assessment level, the developers can then adjust the new development code, APIs, and UIs to achieve a high homogeneity assessment level. When the developers then create or update the new development application's APIs and UIs and the CAI 102 indicates only a minimal or no deviation from the one or more reference applications 141, the user experience of all interfaces across the new development application 141 will be much more consistent and homogeneous.

The client 101 can be any computing device operable to connect to or communicate with at least the CAI 102, or the CAI UI backend 115, (or components interfacing with any of these—whether or not illustrated). In general, the client 101 comprises an electronic computing device operable to receive, transmit, process, and store any appropriate data associated with the AAS 100. There may be any number of clients 101 associated with, or external to, the AAS 100.

The CAI 102 can be any computing device operable to connect to or communicate with at least the CIP 104 and the code repository 132, (or components interfacing with any of these—whether or not illustrated). In general, the CAI 102 comprises an electronic computing device operable to receive, transmit, process, and store any appropriate data associated with the AAS 100.

The CIP 104 can be any computing device operable to connect to or communicate with at least the CAI 102 and the code repository 132, (or components interfacing with any of these—whether or not illustrated). In general, the CIP 104 comprises an electronic computing device operable to receive, transmit, process, and store any appropriate data associated with the AAS 100.

The CAI UI 114 is a client-side interface that may be installed on one or more clients 101. The CAI UI 114 may provide a minimal set of functionality needed to support authentication and communication with the CAI UI backend 115.

The CAI UI backend 115 is a CAI-side interface that may be installed as part of the CAI 102. The CAI UI backend 115 may provide a minimal set of functionality needed to support authentication and communication with the CAI UI 114.

Figure 2:
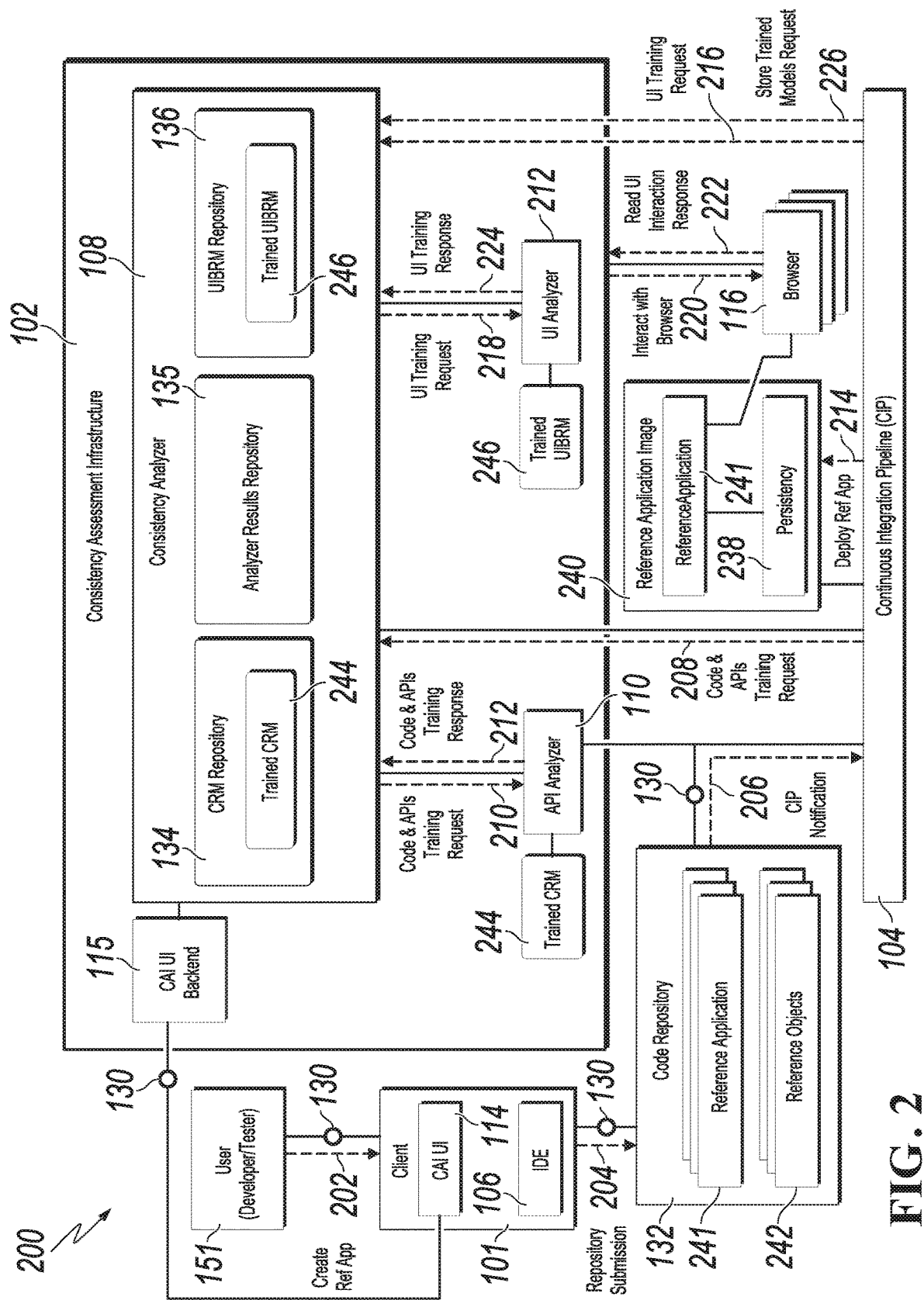
FIG. 2 is a sequence diagram illustrating a method for learning-time training of reference applications using a consistency application infrastructure for achieving interface design consistency in design of interfaces across micro services, according to an implementation of the present disclosure.

FIG. 2 is a sequence diagram illustrating a method 200 for learning-time training of reference applications using a consistency application infrastructure for achieving interface design consistency across micro services, according to an implementation of the present disclosure. For clarity of presentation, the description that follows generally describes method 200 in the context of FIGS. 1, and 3-4. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, or in any order.

At 202, a developer 151 may create one or more reference applications 241, each reference application 241 of the one or more reference applications 241 including a plurality of APIs and optionally UIs following the desired user experience guidelines previously described. The developer 151 may utilize the IDE 106 during the creation of the one or more reference applications 241. The plurality of interfaces of each reference application 241 may include a plurality of APIs, UIs, or other types of interfaces. In one or more other embodiments, the developer may select the one or more reference applications 241 from existing applications that meet the desired user experience guidelines. The one or more reference applications 241, each reference application 241 including the plurality of interfaces, may define a baseline for development and assessment of new applications' code, APIs, and UIs. From 202, method 200 proceeds to 204.

At 204, the developer 151 may submit the one or more reference applications 241 and one or more corresponding sets of reference objects 242 to the code repository 132 using the IDE 106. Each set of the one or more sets of reference objects 242 may include at least one of reference code, a set of reference API definitions, a set of reference UI definitions, and other types of reference objects. The IDE 106 may store the one or more reference applications 241 and the one or more corresponding sets of reference objects 242 at code repository 132. From 204, method 200 proceeds to 206.

At 206, when the one or more reference applications 241 and the one or more corresponding sets of reference objects 242 are stored in the code repository 132, the IDE 106 may send a notification to the CIP 104 indicating that the one or more reference applications 241 and the one or more corresponding sets of reference objects 242 have been submitted to and stored in the code repository 132.

In response to receiving the notification, the continuous integration pipeline 104 may initiate a training process for the reference application 241. In one or more embodiments, the continuous integration pipeline 104 may monitor the code repository 132 for any submissions or updates. When the continuous integration pipeline 104 detects that one or more reference applications 241 and one or more corresponding sets of reference objects 242 have been submitted to the code repository 132, the continuous integration pipeline 104 may initiate the training process for the detected one or more reference applications 241. From 206, method 200 proceeds to 208.

At 208, the CIP 104 may create a code and APIs training request including an indication that the one or more sets of reference objects 242 associated with the one or more reference applications 241 have been stored in the code repository 132 and are to be used for training a CRM. The CIP 104 may send the code and APIs training request to the consistency analyzer 108. From 208, method 200 proceeds to 210.

At 210, in response to receiving the code and APIs training request, the consistency analyzer 108 may send a code and APIs training request including an indication that the one or more sets of reference objects 242 are to be used for training a CRM to the API analyzer 110. In response to receiving the code and APIs training request, the API analyzer 110 may retrieve the one or more sets of reference objects 242 from the code repository 132. In one or more embodiments, each of the code and APIs training requests sent to the consistency analyzer 108 and to the API analyzer 110 may include the one or more sets of reference objects 242, which saves the API analyzer 110 from retrieving them from the code repository 132.

The API analyzer 110 may execute a CRM training process to compute and generate a trained CRM 244 using the one or more sets of reference objects 242 including the corresponding reference code, the set of reference API definitions, and the set of reference UI definitions. During the CRM training process, the API analyzer 110 may read and scan each corresponding reference code of the one or more sets of reference objects 242 to identify each set of reference API code implementations in each corresponding reference code and each set of reference UI code implementations in each corresponding reference code, which may be used in the computation and generation of the trained CRM 244. The API analyzer 110 may also read each corresponding set of reference API definitions of the one or more sets of reference objects 242 to identify an API type, an authentication definition, a pagination definition, and parameters in header and payload of each reference API of the set of reference API definitions, which may also be used in the computation and generation of the trained CRM 244.

The API type may include one of a representational state transfer (REST) API, an open data protocol (ODATA) API, or another API type of API. The authentication definition may include one of user/password login credentials, an open authorization JSON Web token (OAuth JWT), an open authorization opaque (OAuth Opaque) token, a security assertion markup language (SAML), or another type of authentication definitions. Each parameter in the header and payload may include at least one of a depth-of-structure including JSON or extensible markup language (XML) or a type-formatting, which is the type of parameter name formatting (for example, CamelCase, camelCase, separation_by_underscores, lowercase, UPPERCASE, separation/by/slashes, or other types of parameter name formatting).

Similarly, the API analyzer 110 may read each corresponding set of reference UI definitions of the one or more sets of reference objects 242 to identify a UI type, an authentication definition, a pagination definition, and parameters in header and payload of each reference UI of the set of reference UI definitions, which may also be used in the computation and generation of the trained CRM 244. The API analyzer 110 may use a code and API machine learning algorithm to compute and generate the trained CRM 244 on the one or more sets of reference objects 242. From 210, method 200 proceeds to 212.

At 212, when the CRM training process completes and the trained CRM 244 is computed and generated, the API analyzer 110 may send a code and APIs training response including the trained CRM 244 to the consistency analyzer 108. In response to receiving the code and APIs training response, the consistency analyzer 108 may send a code and APIs training response including an indication that the CRM 244 has been successfully trained to the CIP 104. From 212, method 200 proceeds to 214.

At 214, in response to receiving the code and APIs training response indicating that the CRM 244 has been successfully trained, the CIP 104 may perform, for each of the one or more reference applications 241 and each of the one or more corresponding sets of reference objects 242, a UI training process. During the UI training process, the CIP 104 may generate a reference application image 240 including a reference application 241 of the one or more reference applications 241 and a corresponding persistency 238 including reference data sets, configuration data and demonstration data to enable running the application based on a corresponding set of reference objects 242 of the one or more corresponding sets of reference objects 242. The CIP 104 may deploy the reference application image 240 including the reference application 241 and may start execution of the reference application 241. The CIP 104 may also generate a set of UI references, each UI reference of the set of UI references corresponding to each reference UI of the set of reference UIs in the reference application 241. Each UI reference may comprise a uniform resource locator (URL) to each corresponding reference UI associated with the reference application 241. From 214, method 200 proceeds to 216.

At 216, the CIP 104 may create a UI training request including the set of UI references to the set of reference UIs associated in the reference application 241 to be used for training a UIBRM and an indication that the reference application 241 has been started. The CIP 104 may send the UI training request to the consistency analyzer 108. In response to receiving the UI training request, the consistency analyzer 108 may perform a UIBRM training process to compute and generate a trained UIBRM 246 using the set of UI references to the set of reference UIs in the reference application 241, and the specified set of browsers 116. At the start of a browser loop, for each browser 116 of the specified set of browsers 116, the consistency analyzer 108 may launch the browser 116 to be used during a UIBRM training process. From 216, method 200 proceeds to 218.

At 218, the consistency analyzer 108 may send the UI training request including the set of UI references to the set of reference UIs in the reference application 241 to the UI analyzer 112. In response to receiving the UI training request, the UI analyzer 112 may analyze reference UI displays rendered on the browser 116 by the reference application 241 in response to interactions with the set of reference UIs using the UI references to the set of reference UIs. Each reference UI display of the reference UI displays corresponds to each reference UI of the set of reference UIs. Each interaction of the interactions with each reference UI of the set of reference UIs may include a mouse event, a keyboard event, or a touch event, where the touch event is for a device with a touch panel or touch display. From 218, method 200 proceeds to 220.

At 220, at the start of a UI action loop, for each reference UI of the set of reference UIs, the UI analyzer 112, utilizing the URL of the corresponding UI reference, may read a pre-interaction UI image associated with the corresponding reference UI display displayed on the browser 116. The UI analyzer 112 may recognize UI elements of the reference UI display using image recognition. For example, the UI analyzer 112 may utilize at least one of color palette extraction to create at least one color palette from at least one UI image and compare the at least one color palette among one or more reference UI displays, font and font type detection from at least one UI image, line width detection from at least one UI image, graphical user interface (GUI) object recognition, or other UI element recognition methods. The UI elements may include buttons, check-boxes, table grids, input fields, or other types of UI elements. The UI analyzer 112 may determine consistency of the UI elements in visual appearance and layout and generate a visual appearance and layout consistency assessment for the UI elements of the reference UI. For each UI element of the reference UI display, the UI analyzer 112 may send at least one event to the browser to interact with each UI element of the reference UI display, where the at least one event may comprise a mouse event, a keyboard event, or a touch event as appropriate for the type of the UI element. For example, a mouse event or a touch event may be appropriate for a button UI element and a check-box UI element. A keyboard event may be appropriate for an input field UI element and a table grid UI element. From 220, method 200 proceeds to 222.

At 222, the UI analyzer 112 may read a post-interaction UI image associated with the corresponding reference UI display displayed on the browser 116 resulting from the at least one event being sent to the browser 116. The UI analyzer 112 may determine consistency in navigation behavior by comparing the pre-interaction UI image to the post-interaction UI image using image recognition and generate a navigation behavior consistency assessment for the UI elements of the reference UI. The navigation behavior may include the results of rearranging columns, changing the sort order, pressing next, pressing cancel, pressing submit buttons, or other types of navigation events. When the reference UI of the set of reference UIs has completed processing, the UI analyzer 112 may determine whether another reference UI of the set of reference UIs remains to be processed. When the UI analyzer 112 determines that another reference UI of the set of reference UIs remains to be processed, the UI analyzer 112 may return to the start of the UI action loop. When the UI analyzer 112 determines that every reference UI of the set of reference UIs has been processed, the UI analyzer 112 may generate a UI training response including a browser identification (ID) of the browser 116 utilized during the UI analyzer 112 training, the trained UIBRM 246, each visual appearance and layout consistency assessment for the UI elements of each reference UI of the set of reference UIs, and each navigation behavior consistency assessment for the UI elements of each reference UI of the set of reference UIs. The UI analyzer 112 may send the UI training response to the consistency analyzer 108. From 222, method 200 proceeds to 224.

At 224, in response to receiving the UI training response, the consistency analyzer 108 may determine whether another browser 116 of the specified set of browser 116 remains to be utilized in the UIBRM training process. When the consistency analyzer 108 determines that another browser 116 of the specified set of browser 116 remains to be utilized in the UIBRM training process, the consistency analyzer 108 may return to the start of the browser loop. When the consistency analyzer 108 determines that every browser 116 of the specified set of browser 116 has been utilized in the UIBRM training process, the consistency analyzer 108 may send a UI training response including an indication that the UIBRM 246 has been successfully trained to the CIP 104. In response to receiving the UI training response, the CIP 104 may send a store trained models request to the consistency analyzer 108. From 224, method 200 proceeds to 226.

At 226, in response to receiving the store trained models request, the consistency analyzer 108 may store the trained CRM 244 in the CRM repository 134. The consistency analyzer 108 may also store the UIBRM 246 in the UIBRM repository 136. The consistency analyzer 108 may send a store trained models response including an indication that the trained CRM 224 and the trained UIBRM 246 have been successfully stored to the CIP 104. After 226, method 200 can stop.

Figure 3:
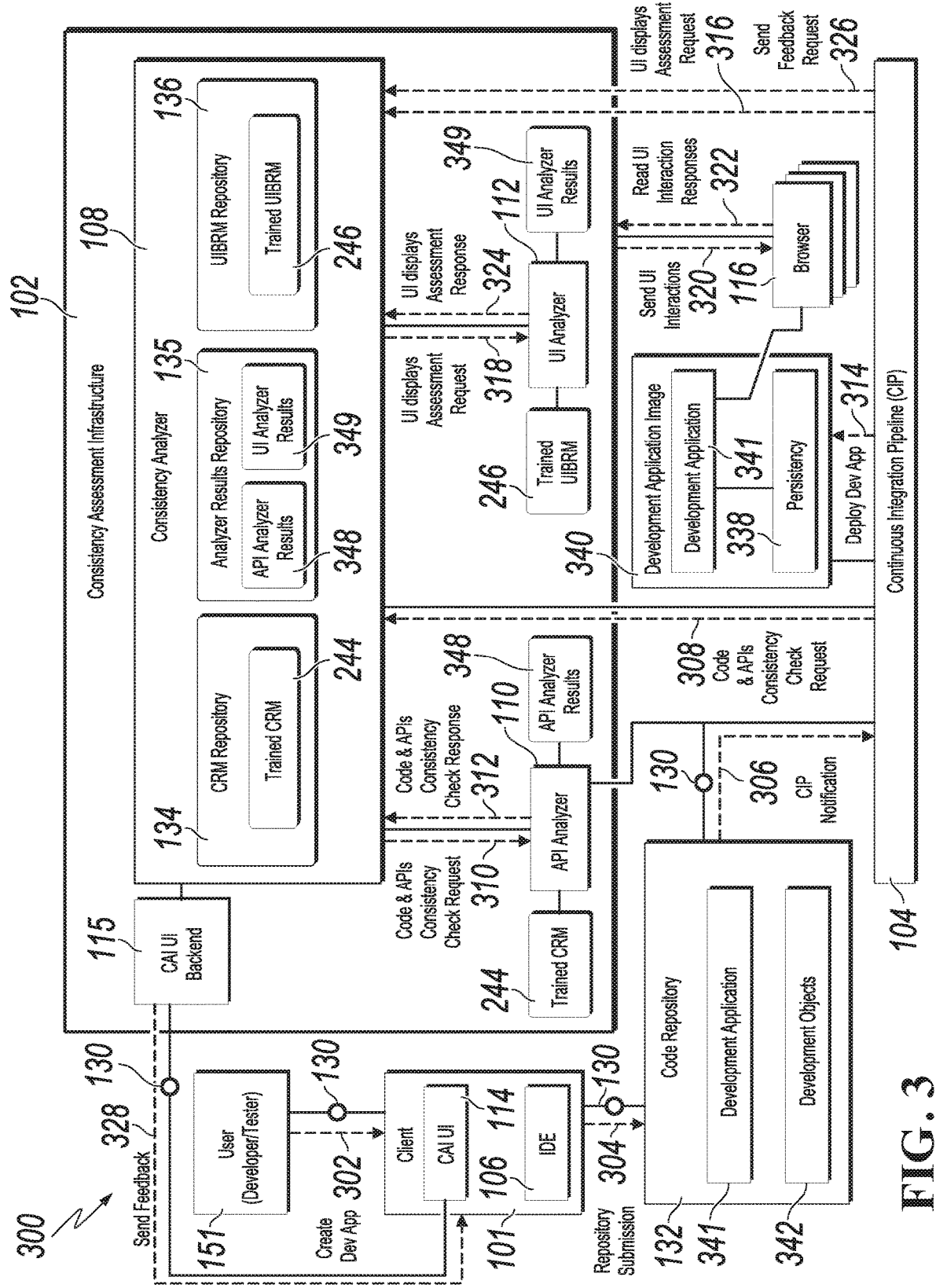
FIG. 3 is a sequence diagram illustrating a method for evaluation-time assessment of a new application using a consistency application infrastructure for achieving interface design consistency across micro services, according to an implementation of the present disclosure.

FIG. 3 is a sequence diagram illustrating a method 300 for evaluation-time assessment of a new application using the consistency application infrastructure for achieving interface design consistency across micro services, according to an implementation of the present disclosure. For clarity of presentation, the description that follows generally describes method 300 in the context of FIGS. 1-2, and 4. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, or in any order.

At 302, a developer 151 may create a development application 341 including a plurality of interfaces following the desired user experience guidelines previously described. The developer 151 may utilize the IDE 106 during the creation of the development application 341. The plurality of interfaces may include a plurality of APIs, UIs, or other types of interfaces. From 302, method 300 proceeds to 304.

At 304, the developer 151 may submit the development application 341 and an associated set of development objects 342 to the code repository 132 using the IDE 106. The set of development objects 342 may include at least one of development code, a set of development API definitions, a set of development UI definitions, and other types of development objects. The IDE 106 may store the development application 341 and the set of development objects 342 at code repository 132. From 304, method 300 proceeds to 306.

At 306, when the development application 341 and the set of development objects 342 are stored in the code repository 132, the IDE 106 may send a CIP notification to the CIP 104 indicating that the development application 341 and the set of development objects 342 have been submitted to and stored in the code repository 132. From 306, method 300 proceeds to 308.

At 308, in response to receiving the CIP notification, the CIP 104 may create a code and APIs consistency check request including an indication that the development application 341 and the set of development objects 342 have been stored in the code repository 132. The CIP 104 may send the code and APIs consistency check request to the consistency analyzer 108. From 308, method 300 proceeds to 310.

At 310, in response to receiving the code and APIs consistency check request, the consistency analyzer 108 may send a code and APIs consistency check request including an indication that the set of development objects 342 are to be used for the code and APIs consistency check to the API analyzer 110. In response to receiving the code and APIs consistency check request, the API analyzer 110 may retrieve the set of development objects 342 from the code repository 132. In one or more embodiments, each of the code and APIs consistency check requests sent to the consistency analyzer 108 and to the API analyzer 110 may include the set of development objects 342, which saves the API analyzer 110 from retrieving them from the code repository 132.

The API analyzer 110 may read and scan the development code of the set of development objects 342 to identify a set of development API code implementations in the development code and a set of development UI code implementations in the development code, which may be used in the code and APIs consistency check with the trained CRM 244. The API analyzer 110 may also read the set of development API definitions of the set of development objects 142 to identify a set of parameters from each development API of the set of development APIs. The set of parameters from a development API may include at least one of an API type, an authentication definition, pagination definition, and parameters in header and payload of each development API of the set of development APIs. The API type, the authentication definition, and the depth-of-structure and the type-formatting for each parameter in the header and payload are as previously described. Similarly, the API analyzer 110 may read the set of development UI definitions of the set of development objects 342 to identify a set of parameters from each development UI of the set of development UIs.

The API analyzer 110 may compare the trained CRM 244 to the set of development API code implementations, the set of development UI code implementations, the set of parameters from each development API of the set of development APIs, and the set of parameters from each development UI of the set of development UIs to generate a set of code and APIs consistency assessments of the set of development API code implementations, the set of development UI code implementations, the set of development APIs, and the set of development UIs, where each code and APIs consistency assessment of the set of code and APIs consistency assessments corresponds to each of the set of development API code implementations, the set of development UI code implementations, the set of development APIs, and the set of development UIs. The API analyzer 110 may generate API analyzer results 348 including the set of code and APIs consistency assessments. If the trained CRM 244 provided additional output information (for example, a sub-category received an unsatisfactory assessment, such as, for example compare above the authentication), the API analyzer 110 may also include the additional output information in the API analyzer results 348. The API analyzer 110 may send a code and APIs consistency check response including the API analyzer results 348 to the consistency analyzer 108. From 310, method 300 proceeds to 312.

At 312, in response to receiving the code and APIs consistency check response, the consistency analyzer 108 may store the API analyzer results 348 with the URLs of the analyzed set of development objects 342 at the analyzer results repository 135. The consistency analyzer 108 may send a code and APIs consistency check response including an indication that the set of development objects 342 has been successfully checked to the CIP 104. From 312, method 300 proceeds to 314.

At 314, in response to receiving the code and APIs consistency check response indicating that the set of development objects 342 has been successfully checked, the CIP 104 may generate a development application image 340 including the development application 341 and a corresponding persistency 338 based on the set of development objects 342. The CIP 104 may deploy the development application image 340 including the development application 341 and may start execution of the development application 341. The CIP 104 may also generate a set of UI references, each UI reference of the set of UI references corresponding to each development UI of the set of development UIs in the development application 341. Each UI reference may comprise a URL to each corresponding development UI associated with the development application 341. From 314, method 300 proceeds to 316.

At 316, the CIP 104 may create a UI displays assessment request including the set of UI references to the set of development UIs associated with the development application 341 and an indication that the development application 341 has been started. The CIP 104 may send the UI displays assessment request to the consistency analyzer 108. In response to receiving the UI displays assessment request, the consistency analyzer 108 may perform a UI displays assessment process to generate assessments of development UI displays by comparing the trained UIBRM to the development UI displays rendered on each browser 116 of the specified set of browser 116 by the development application in response to interactions with at least a subset of the set of development UIs. At the start of a browser loop, for each browser 116 of the specified set of browsers 116, the consistency analyzer 108 may launch the browser 116 to be used during the UI displays assessment process. From 316, method 300 proceeds to 318.

At 318, the consistency analyzer 108 may send a UI displays assessment request including the set of UI references to the set of development UIs in the development application 341 to the UI analyzer 112. In response to receiving the UI displays assessment request, the UI analyzer 112 may analyze development UI displays rendered on the browser 116 by the development application 341 in response to interactions with the set of development UIs using the UI references to the set of development UIs. Each development UI display of the development UI displays corresponds to each development UI of the set of development UIs. From 318, method 300 proceeds to 320.

At 320, at the start of a UI action loop, for each development UI of the set of development UIs at the start of a development UI action loop, the UI analyzer 112, utilizing the URL of the corresponding UI reference, may read a pre-interaction UI image associated with the corresponding development UI display displayed on the browser 116. The UI analyzer 112 may recognize UI elements of the development UI display using image recognition. The UI analyzer 112 may determine consistency of the UI elements in visual appearance and layout and generate a visual appearance and layout consistency assessment for the UI elements of the development UI display by comparing the trained UIBRM 346 with the recognized UI elements of the development UI display. For each UI element of the development UI display, the UI analyzer 112 may send at least one event to the browser to interact with each UI element of the development UI display, where the at least one event may comprise a mouse event, a keyboard event, or a touch event as appropriate for the type of the UI element, as previously described. From 320, method 300 proceeds to 322.

At 322, The UI analyzer 112 may read a post-interaction UI image associated with the corresponding development UI display displayed on the browser 116 resulting from the at least one event being sent to the browser 116. The UI analyzer 112 may determine consistency in navigation behavior by comparing the trained UIBRM 146 with the comparison of the pre-interaction UI image to the post-interaction UI image using image recognition and generate a navigation behavior consistency assessment for the UI elements of the development UI. As previously described, the navigation behavior may include the results of rearranging columns, changing the sort order, pressing next, pressing cancel, pressing submit buttons, or other types of navigation events.

When the development UI of the set of development UIs has completed processing, the UI analyzer 112 may determine whether another development UI of the set of development UIs remains to be processed. When the UI analyzer 112 determines that another development UI of the set of development UIs remains to be processed, the UI analyzer 112 may return to the start of the UI action loop. When the UI analyzer 112 determines that every development UI of the set of development UIs has been processed, the UI analyzer 112 may generate UI analyzer results 349 including a browser identification (ID) of the browser 116 utilized during the UI analyzer 112 assessment, each visual appearance and layout consistency assessment for the UI elements of each development UI of the set of development UIs, each navigation behavior consistency assessment for the UI elements of each development UI of the set of development UIs, each pre-interaction image and post-interaction image associated with each development UI of the set of development UIs, and the URL of each development UI of the set of development UIs. If the trained UIBRM 346 provided additional output information (for example, a sub-category received an unsatisfactory assessment, such as, for example compare above the "color palette" or "font type"), the UI analyzer 112 may also include the additional output information in the UI analyzer results 349. The UI analyzer 112 may send a UI displays assessment response including the UI analyzer results 349 to the consistency analyzer 108. From 322, method 200 proceeds to 324.

At 324, in response to receiving the UI displays assessment response, the consistency analyzer 108 may store or update the UI analyzer results 349 with the URLs of the assessed set of development UI displays in the analyzer results repository 135. The consistency analyzer 108 may determine whether another browser 116 of the specified set of browser 116 remains to be utilized in the UI displays assessment process. When the consistency analyzer 108 determines that another browser 116 of the specified set of browser 116 remains to be utilized in the UI displays assessment process, the consistency analyzer 108 may return to the start of the browser loop. When the consistency analyzer 108 determines that every browser 116 of the specified set of browser 116 has been utilized in the UI displays assessment process, the consistency analyzer 108 may send a UI displays assessment response including an indication that the set of development UI displays has been successfully assessed to the CIP 104. In response to receiving the UI displays assessment response indicating that the set of development UI displays has been successfully assessed, the CIP 104 may send a send feedback request to the consistency analyzer 108. From 324, method 300 proceeds to 326.

At 326, in response to receiving the send feedback request, the consistency analyzer 108 may generate a feedback assessment including the API analyzer results 348 and the UI analyzer results 349.

In one or more embodiments, the consistency analyzer 108 may determine whether the development application 341 and the associated set of development objects 342 meets or exceeds the desired guidelines based on the assessment results. For example, the consistency analyzer 108 may determine whether the assessment exceeds a high consistency threshold and a low deviation threshold indicating minimal to no deviation from the trained CRM 144 and the trained UIBMR 246. When the consistency analyzer 108 determines that the development application 341 and the associated set of development objects 342 meets or exceeds the desired guidelines, the consistency analyzer 108 may initiate a feedback training process to improve the trained CRM 244 and the trained UIBRM 246 on the development application 341 and the associated set of development objects 342. The trained CRM 244 and the trained UIBRM 246 may be continuously improved with each additional development application and the associated set of development objects that meets or exceeds the desired guidelines as embodied in the trained models, the trained CRM 244 and the trained UIBRM 246.

The consistency analyzer 108 may send the feedback assessment to one or more developers 151 of a development team or one or more testers 151 of a quality assurance team at one or more clients 101. From 326, method 300 proceeds to 328.

At 328, in response to receiving the feedback assessment, the API artifacts of the API analyzer results 348 may be visualized to see the API artifacts that have an assessment below a threshold or a subset of the API artifacts that have a below average assessment. The development code URL may be displayed, together with the assessment value. If additional information is available (for example, the sub-category), this may be visualized as well. A link to the reference API definition may be provided, so developers can compare with the development API to the desired state. The UI images or URLs of the UI analyzer results 349 may also be visualized, to see which ones have an assessment below a threshold or a subset that have a below average assessment. The UI may be displayed together with the assessment value. If additional information is available (for example, the sub-category), it may be visualized as well. A link to the reference UI may also be provided, so developers can compare the development UI with the desired state. After 328, method 300 can stop.

Figure 4:
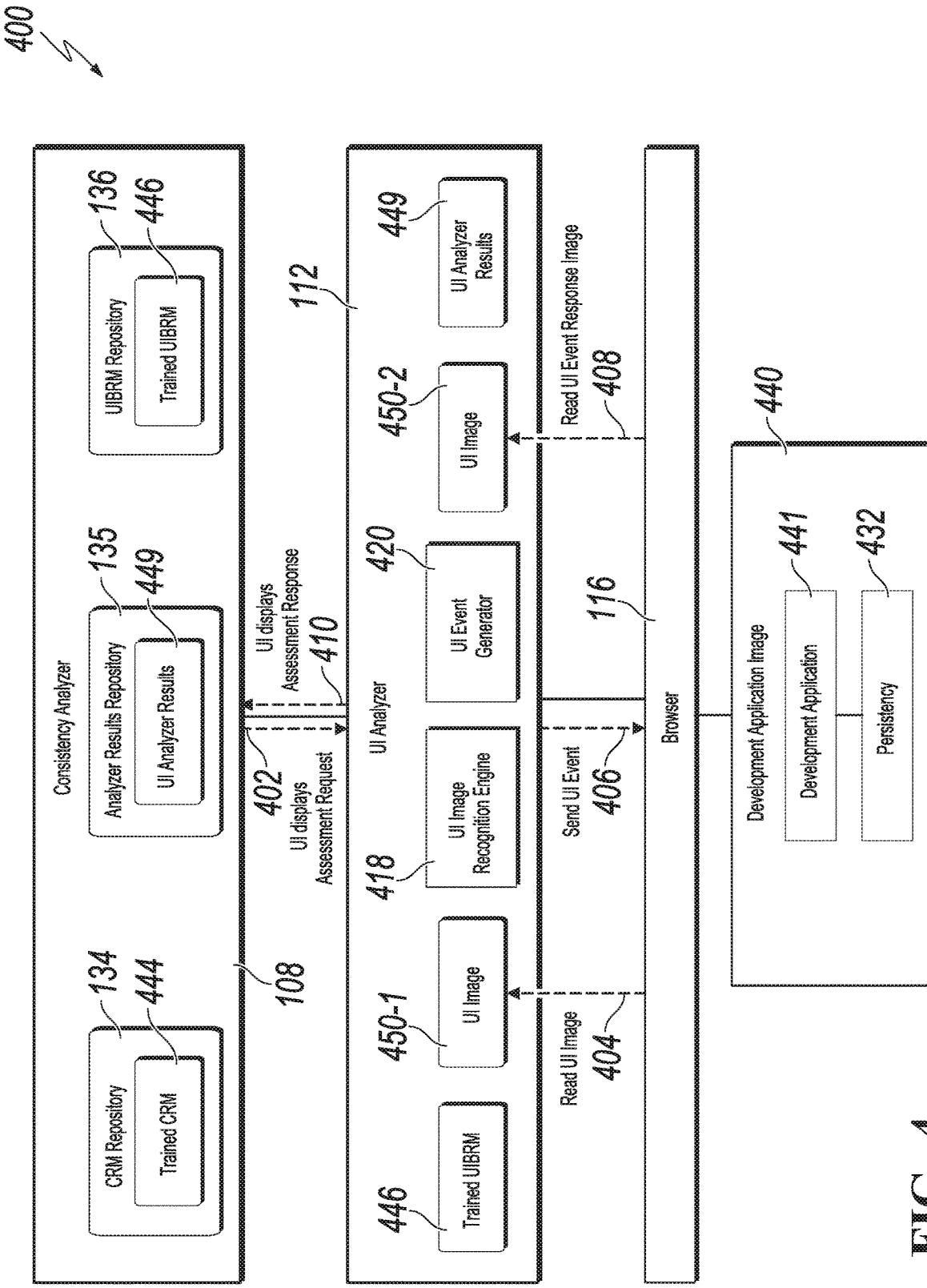
FIG. 4 is a sequence diagram illustrating a method for evaluation-time assessment of user interface displays of a new application using a consistency application infrastructure for achieving interface design consistency across micro services, according to an implementation of the present disclosure.

FIG. 4 is a sequence diagram illustrating a method 400 for evaluation-time assessment of user interface displays of a new application using a consistency application infrastructure for achieving interface design consistency across micro services, according to an implementation of the present disclosure. For clarity of presentation, the description that follows generally describes method 400 in the context of FIGS. 1-3. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, or in any order.

At 402, the consistency analyzer 108 may perform a UI displays assessment process to generate assessments of development UI displays by comparing the trained UIBRM 446 to the development UI displays rendered on a browser 116 by the development application 441 in response to interactions with at least a subset of the set of development UIs of the development application 441. The consistency analyzer 108 may launch the browser 116 to be used during the UI displays assessment process. The consistency analyzer 108 may send a UI displays assessment request including the set of UI references to the set of development UIs in the development application 441 to the UI analyzer 112. In response to receiving the UI displays assessment request, the UI analyzer 112 may analyze development UI displays rendered on the browser 116 by the development application 441 in response to interactions with the set of development UIs using the UI references to the set of development UIs. Each development UI display of the development UI displays corresponds to each development UI of the set of development UIs. From 402, method 400 proceeds to 404.

At 404, at the start of a UI action loop, for each development UI of the set of development UIs, the UI analyzer 112, utilizing the URL of the corresponding UI reference, may read a pre-interaction UI image associated with the corresponding development UI display displayed on the browser 116. The UI analyzer 112 may utilize a UI image recognition engine 418 having image recognition to recognize UI elements of the development UI display. The UI analyzer 112 may determine consistency of the UI elements in visual appearance and layout and generate a visual appearance and layout consistency assessment for the UI elements of the development UI display by comparing the trained UIBRM 446 with the recognized UI elements of the development UI display. From 404, method 400 proceeds to 406.

At 406, for each UI element of the development UI display, the UI analyzer 112 may utilize a UI event generator 420 to simulate and send at least one simulated event to the browser 116 to interact with each UI element of the development UI display, where the at least one event may comprise a mouse event, a keyboard event, or a touch event as appropriate for the type of the UI element, as previously described. From 406, method 400 proceeds to 408.

At 408, the UI analyzer 112 may read a post-interaction UI response image associated with the corresponding development UI display displayed on the browser 116 resulting from the at least one event being sent to the browser 116. The UI analyzer 112 may compare the pre-interaction UI image with the post-interaction UI response image utilizing the UI image recognition engine 418 to generate a UI image comparison. The UI analyzer 112 may determine consistency in navigation behavior by comparing the trained UIBRM 446 with the UI image comparison to generate a navigation behavior consistency assessment for the UI elements of the development UI. As previously described, the navigation behavior may include the results of rearranging columns, changing the sort order, pressing next, pressing cancel, pressing submit buttons, or other types of navigation events.

In one or more embodiments, the UI analyzer 112 may capture a movie or a video instead of or in addition to reading one or more image. UI analyzer 112 may utilize a movie recognition engine to recognize UI elements of the development UI display and to compare a pre-interaction movie with a post-interaction movie, where the post-interaction movie starts before sending at least one event to the browser 116 and continues until after the at least one event has been sent, which may allow navigation behavior that occurs over a period of time to be captured and compared.

When the development UI of the set of development UIs has completed processing, the UI analyzer 112 may determine whether another development UI of the set of development UIs remains to be processed. When the UI analyzer 112 determines that another development UI of the set of development UIs remains to be processed, the UI analyzer 112 may return to the start of the UI action loop. When the UI analyzer 112 determines that every development UI of the set of development UIs has been processed, the UI analyzer 112 may generate UI analyzer results 449 including a browser identification (ID) of the browser 116 utilized during the UI analyzer 112 assessment, each visual appearance and layout consistency assessment for the UI elements of each development UI of the set of development UIs, each navigation behavior consistency assessment for the UI elements of each development UI of the set of development UIs, each pre-interaction image and post-interaction image associated with each development UI of the set of development UIs, and the URL of each development UI of the set of development UIs. If the trained UIBRM 446 provided additional output information (for example, a sub-category received an unsatisfactory assessment, such as, for example compare above the "color palette" or "font type"), the UI analyzer 112 may also include the additional output information in the UI analyzer results 449. The UI analyzer 112 may send a UI displays assessment response including the UI analyzer results 349 to the consistency analyzer 108. From 408, method 400 proceeds to 410.

At 410, in response to receiving the UI displays assessment response, the consistency analyzer 108 may store the UI analyzer results 449 of the assessed set of development UI displays in the analyzer results repository 135.

The API analyzer 110 may use a machine learning algorithm for consistency assessment of APIs during learning-time and evaluation-time operation. In one or more embodiments, the API analyzer 110 may utilize an un-supervised learning algorithm. In the un-supervised learning algorithm, an API metric in a multi-dimensional space may be defined to describe an API, which may be used to compute the distance between two APIs. A set of APIs may have a corresponding set of API metrics, where each API metric describes its corresponding API. Then, a clustering algorithm may be applied to the set of APIs metrics in this multi-dimensional space. APIs which are close are found in a cluster. APIs which diverge and have different API metric values are found in other clusters or at a larger distance to a cluster. The APIs of desired form should be in a particular selected cluster, as they have similar values in their API metrics. The selected cluster identifies the cluster which is the desired cluster. With respect to the defined API metric, the selected cluster is more consistent than the complete set of clusters. For a new API, its API metric value can be measured in this multi-dimensional space. If the new API belongs to the selected cluster, it is assumed to be consistent with respect to the cluster selected above, the selected cluster. The API metric may be, for example, implemented in a program, which extracts the parameters from the API. The transformation from strings to numbers can be done in this program as well or in a later data pipeline step.

In the un-supervised learning approach, a set of parameters may be defined for an API. The defined set of parameters for an API may include at least one of an API type, an authentication definition, paging/pagination definition, and parameters in header and payload of the API. An API type may have discrete values (for example, "REST" for representational state transfer, "ODATA" for open data protocol, or other API types), which may be mapped to numbers (for example, 1, 2 . . . ). A security/authentication definition may have discrete values (for example, "user/password" for login credentials, "OAuth JWT" for open authorization JSON Web token, "OAuth Opaque" for open authorization opaque token, or "SAML" for security assertion markup language or other authentication definitions), which may be mapped to numbers (for example, 1, 2, 3, 4, . . . ). A paging/pagination definition may be defined similarly to the security/authentication definition. Each parameter in the header and payload may have a depth-of-structure (for example, JSON or extensible markup language (XML)) and a type-formatting, which is the type of parameter name formatting (for example, CamelCase, camelCase, separation_by_underscores, lowercase, UPPERCASE, separation/by/slashes, or other types of parameter name formatting). The depth of structure for different entries may be computed. This results in a vector of integers, one number for each entry. The vector of integers may be aggregated to three values including length of the vector, average of the numbers, and standard deviation of the numbers. If the length of the vector of two APIs similar, they have a similar number of entries. Similarity of two APIs: if they have a similar average and standard deviation, the entries are similarly defined. Balanced-ness (of the JSON or XML): if the standard deviation of the depth vector entries is small, the entries have similar depth. The type-formatting may be computed on a list of strings including one of the metric program identifies the type-formatting and assigns a number for each parameter or the average and standard deviation may be computed, which state how homogeneous one API is. If the number is the same for another API, then they use the same type-formatting. The type-formatting may also be identified by an own clustering based on information on character (lower case, Upper case, separation-character). Then, every API a has a corresponding vector of numbers a_i. The distance d_ij of two APIs a_i and a_j may be defined as d_ij=|a_i−a_j|, for example, as the square-root of the sum of the difference of elements squared. If one parameter is considered more important than another, it can be given a higher weight in the distance computation. Assuming, the values are all normalized to the range [0 . . . 1] (or [0 . . . 1000]), one can give the parameter a_i a weight >1 to make it more significant in the clustering. The clustering algorithm may comprise a K-means clustering algorithm, a Mean-shift clustering algorithm, or another type of clustering algorithm.

In one or more embodiments, the API analyzer 110 may utilize a supervised learning algorithm. In the supervised learning algorithm, the approach is to create "labeled data". A human, such as, developer 151, may look at the APIs and gives them each a label, such as, "desired" or "not-desired", or a label of [0 . . . 10] to have a range of desirability, which 0 is not-desired, 5 is somewhat desired, and 10 is desired. This set of data needs to be balanced: one needs a similar number of APIs labels as "desired" and "not desired". Then, a neural net is trained on this data. Afterwards, a new API can be given to the neural net and it assesses the API as "desired" or "less desired". A similar method as previously describe for the un-supervised learning algorithm may be utilized to translate each API in the text file defining the APIs into a vector of numbers. The translated vector of numbers corresponding to each API may then be provide to the neural net for analysis. After 410, method 400 can stop.

Figure 5:
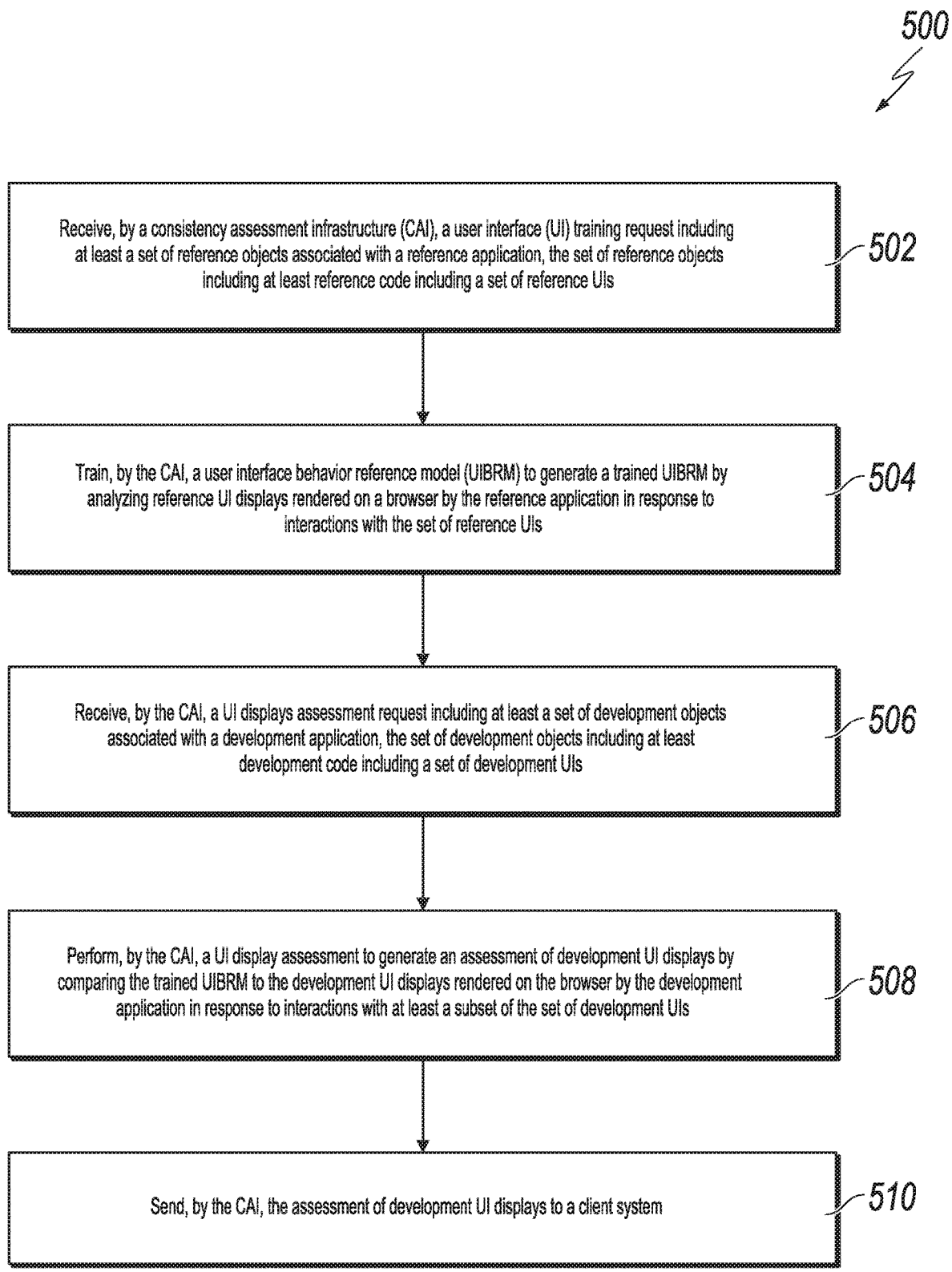
FIG. 5 is a flowchart illustrating an example of a computer-implemented method for achieving interface design consistency across micro services, according to an implementation of the present disclosure.

FIG. 5 is a flowchart illustrating an example of a computer-implemented method 500 for achieving interface design consistency across micro services, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a UI training request including at least a set of reference objects associated with a reference application is received, by a CAI, the set of reference objects including at least reference code including a set of reference UIs. In some implementations, a code and APIs training request including at least the set of reference objects associated with the reference application is received, where the reference code further includes a set of reference APIs, and where the set of reference objects further includes at least a set of reference API definitions associated with the set of reference APIs; a CRM is trained to generate a trained CRM using the reference code and the set of reference API definitions; a code and APIs consistency check request including at least the set of development objects associated with the development application is received, where the development code further includes a set of developments APIs, and where the set of development objects further includes at least a set of development API definitions associated with the set of development APIs; a code and APIs consistency check is performed to generate a code and APIs consistency assessment of the development code and the set of development APIs by comparing the trained CRM to the development code and the set of development API definitions; and the code and APIs consistency assessment is sent to the client system. In some implementations, performing the code and APIs consistency check further comprises: the development code is read to identify the set of development APIs; and the set of development API definitions is read to identify a set of API parameters from each development API of the set of development APIs, where comparing the trained CRM to the development code and the set of development API definitions further includes the trained CRM is compared to the set of API parameters from each development API of the set of development APIs. In some implementations, the set of API parameters from each development API includes at least one of an API type, an authentication definition, a pagination definition, and parameters in a header and a payload of the development API. In some implementations, performing the code and APIs consistency check to generate the code and APIs consistency assessment of the development code and the set of development APIs further comprises using a machine learning algorithm, and the machine learning algorithm comprises at least one of a clustering algorithm or a supervised learning algorithm using a neural net. From 502, method 500 proceeds to 504.

At 504, a UIBRM is trained, by the CAI, to generate a trained UIBRM by analyzing reference UI displays rendered on a browser by the reference application in response to interactions with the set of reference UIs. From 504, method 500 proceeds to 506.

At 506, a UI displays assessment request including at least a set of development objects associated with a development application is received, by the CAI, the set of development objects including at least development code including a set of development UIs. From 506, method 500 proceeds to 508.

At 508, a UI displays assessment is performed, by the CAI, to generate an assessment of development UI displays by comparing the trained UIBRM to the development UI displays rendered on the browser by the development application in response to interactions with at least a subset of the set of development UIs. In some implementations, comparing the trained UIBRM to the development UI displays rendered on the browser further comprises: a pre-interaction UI image associated with a development UI display of the development UI displays rendered on the browser is read; UI elements of the development UI display are recognized using image recognition; the trained UIBRM is compared with the UI elements to generate a visual appearance and layout consistency assessment for the UI elements of the development UI display; at least one event is sent to the browser to interact with at least one UI element of the UI elements, where the at least one event may comprise a mouse event, a keyboard event, or a touch event; a post-interaction UI image associated with the development UI display rendered on the browser by the development application is read after sending the at least one event to the browser; the pre-interaction UI image is compared to the post-interaction UI image using image recognition to determine navigation behavior results for the at least one UI element; and the trained UIBRM is compared with the navigation behavior results to generate a navigation behavior consistency assessment for the at least one UI element. In some implementations, the assessment of the development UI displays further comprises the visual appearance and layout consistency assessment for the UI elements of the development UI display and the navigation behavior consistency assessment for the at least one UI element of the development UI display. From 508, method 500 proceeds to 510.

At 510, the assessment of development UI displays is sent, by the CAI, to a client system. After 520, method 500 can stop.

Figure 6:
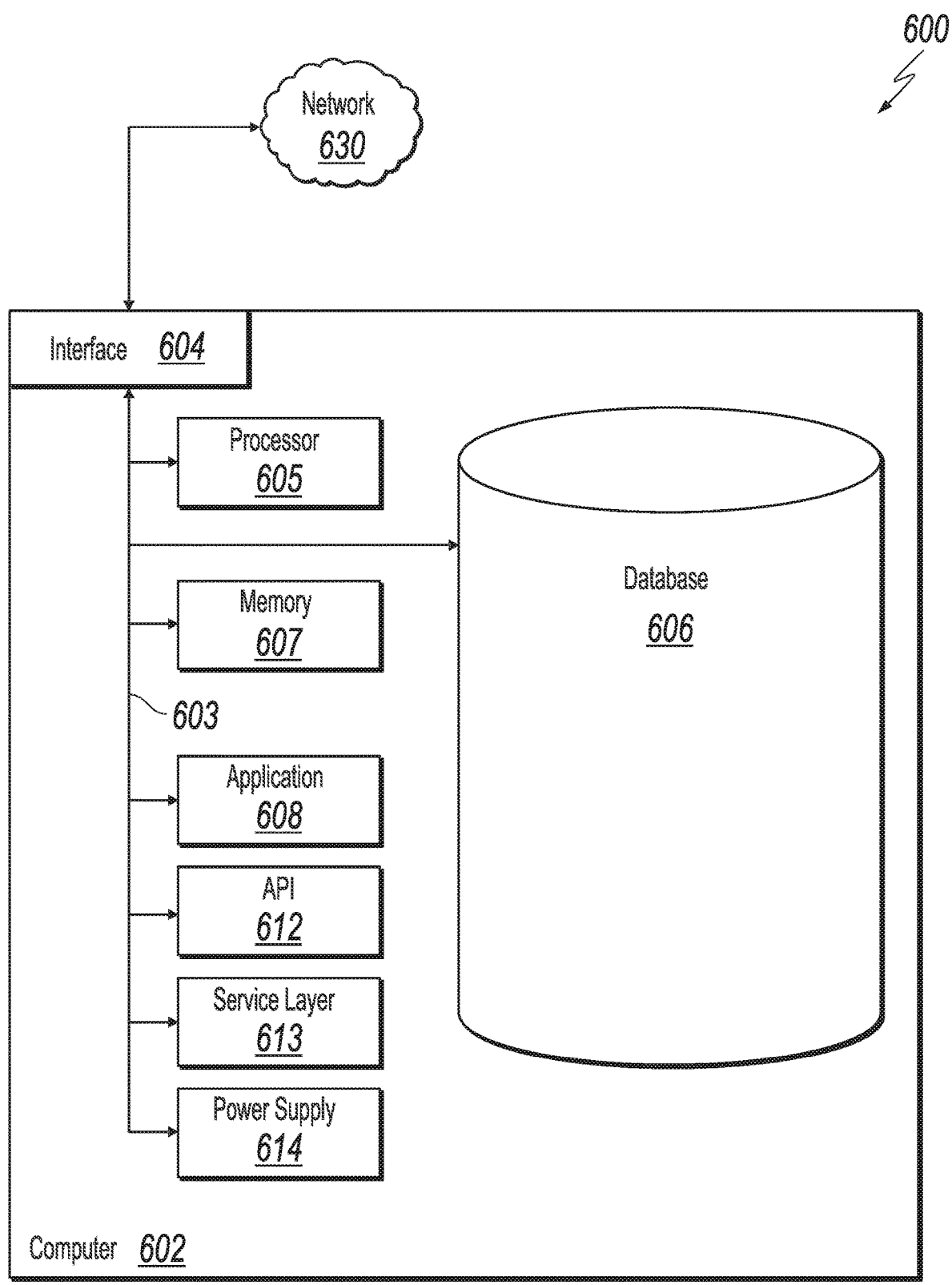
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch display, or a combination of input devices that can accept user information, and an output device that conveys information associated with the operation of the Computer 602, including digital data, visual, audio, another type of information, or a combination of types of information, on a graphical-type UI (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: receiving, by a consistency assessment infrastructure (CAI), a user interface (UI) training request including at least a set of reference objects associated with a reference application, the set of reference objects including at least reference code including a set of reference UIs; training, by the CAI, a user interface behavior reference model (UIBRM) to generate a trained UIBRM by analyzing reference UI displays rendered on a browser by the reference application in response to interactions with the set of reference UIs; receiving, by the CAI, a UI display assessment request including at least a set of development objects associated with a development application, the set of development objects including at least development code including a set of development UIs; performing, by the CAI, a UI display assessment to generate an assessment of development UI displays by comparing the trained UIBRM to the development UI displays rendered on the browser by the development application in response to interactions with at least a subset of the set of development UIs; and sending, by the CAI, the assessment of development UI displays to a client system.

The foregoing and other described implementations can each, optionally, include one or more of the following features:

A first feature, combinable with any of the following features, wherein comparing the trained UIBRM to the development UI displays rendered on the browser further comprises: reading a pre-interaction UI image associated with a development UI display of the development UI displays rendered on the browser; recognizing UI elements of the development UI display using image recognition; comparing the trained UIBRM with the UI elements to generate a visual appearance and layout consistency assessment for the UI elements of the development UI display; sending at least one event to the browser to interact with at least one UI element of the UI elements, wherein the at least one event may comprise a mouse event, a keyboard event, or a touch event; reading a post-interaction UI image associated with the development UI display rendered on the browser by the development application after sending the at least one event to the browser; comparing the pre-interaction UI image to the post-interaction UI image using image recognition to determine navigation behavior results for the at least one UI element; and comparing the trained UIBRM with the navigation behavior results to generate a navigation behavior consistency assessment for the at least one UI element.

A second feature, combinable with any of the previous or following features, wherein the assessment of the development UI displays further comprises the visual appearance and layout consistency assessment for the UI elements of the development UI display and the navigation behavior consistency assessment for the at least one UI element of the development UI display.

A third feature, combinable with any of the previous or following features, further comprising: receiving a code and application programming interfaces (APIs) training request including at least the set of reference objects associated with the reference application, wherein the reference code further including a set of reference APIs, and wherein the set of reference objects further including at least a set of reference API definitions associated with the set of reference APIs; training a code reference model (CRM) to generate a trained CRM using the reference code and the set of reference API definitions; receiving a code and APIs consistency check request including at least the set of development objects associated with the development application, wherein the development code further including a set of developments APIs, and wherein the set of development objects further including at least a set of development API definitions associated with the set of development APIs; performing a code and APIs consistency check to generate a code and APIs consistency assessment of the development code and the set of development APIs by comparing the trained CRM to the development code and the set of development API definitions; and sending the code and APIs consistency assessment to the client system.

A fourth feature, combinable with any of the previous or following features, wherein performing the code and APIs consistency check further comprises: reading the development code to identify the set of development APIs; and reading the set of development API definitions to identify a set of API parameters from each development API of the set of development APIs, wherein comparing the trained CRM to the development code and the set of development API definitions further includes comparing the trained CRM to the set of API parameters from each development API of the set of development APIs.

A fifth feature, combinable with any of the previous or following features, wherein the set of API parameters from each development API includes at least one of an API type, an authentication definition, a pagination definition, and parameters in a header and a payload of the development API.

A sixth feature, combinable with any of the previous or following features, wherein performing the code and APIs consistency check to generate the code and APIs consistency assessment of the development code and the set of development APIs further comprises using a machine learning algorithm, and wherein the machine learning algorithm comprises at least one of a clustering algorithm or a supervised learning algorithm using a neural net.

In a second implementation, a non-transitory, computer-readable medium storing one or more instructions executable by a computer system to perform operations comprising: receiving, by a consistency assessment infrastructure (CAI), a user interface (UI) training request including at least a set of reference objects associated with a reference application, the set of reference objects including at least reference code including a set of reference UIs; training, by the CAI, a user interface behavior reference model (UIBRM) to generate a trained UIBRM by analyzing reference UI displays rendered on a browser by the reference application in response to interactions with the set of reference UIs; receiving, by the CAI, a UI display assessment request including at least a set of development objects associated with a development application, the set of development objects including at least development code including a set of development UIs; performing, by the CAI, a UI display assessment to generate an assessment of development UI displays by comparing the trained UIBRM to the development UI displays rendered on the browser by the development application in response to interactions with at least a subset of the set of development UIs; and sending, by the CAI, the assessment of development UI displays to a client system.

The foregoing and other described implementations can each, optionally, include one or more of the following features:

A first feature, combinable with any of the following features, wherein comparing the trained UIBRM to the development UI displays rendered on the browser further comprises: reading a pre-interaction UI image associated with a development UI display of the development UI displays rendered on the browser; recognizing UI elements of the development UI display using image recognition; comparing the trained UIBRM with the UI elements to generate a visual appearance and layout consistency assessment for the UI elements of the development UI display; sending at least one event to the browser to interact with at least one UI element of the UI elements, wherein the at least one event may comprise a mouse event, a keyboard event, or a touch event; reading a post-interaction UI image associated with the development UI display rendered on the browser by the development application after sending the at least one event to the browser; comparing the pre-interaction UI image to the post-interaction UI image using image recognition to determine navigation behavior results for the at least one UI element; and comparing the trained UIBRM with the navigation behavior results to generate a navigation behavior consistency assessment for the at least one UI element.

A second feature, combinable with any of the previous or following features, wherein the assessment of the development UI displays further comprises the visual appearance and layout consistency assessment for the UI elements of the development UI display and the navigation behavior consistency assessment for the at least one UI element of the development UI display.

A third feature, combinable with any of the previous or following features, further comprising: receiving a code and application programming interfaces (APIs) training request including at least the set of reference objects associated with the reference application, wherein the reference code further including a set of reference APIs, and wherein the set of reference objects further including at least a set of reference API definitions associated with the set of reference APIs; training a code reference model (CRM) to generate a trained CRM using the reference code and the set of reference API definitions; receiving a code and APIs consistency check request including at least the set of development objects associated with the development application, wherein the development code further including a set of developments APIs, and wherein the set of development objects further including at least a set of development API definitions associated with the set of development APIs; performing a code and APIs consistency check to generate a code and APIs consistency assessment of the development code and the set of development APIs by comparing the trained CRM to the development code and the set of development API definitions; and sending the code and APIs consistency assessment to the client system.

A fourth feature, combinable with any of the previous or following features, wherein performing the code and APIs consistency check further comprises: reading the development code to identify the set of development APIs; and reading the set of development API definitions to identify a set of API parameters from each development API of the set of development APIs, wherein comparing the trained CRM to the development code and the set of development API definitions further includes comparing the trained CRM to the set of API parameters from each development API of the set of development APIs.

A fifth feature, combinable with any of the previous or following features, wherein the set of API parameters from each development API includes at least one of an API type, an authentication definition, a pagination definition, and parameters in a header and a payload of the development API.

A sixth feature, combinable with any of the previous or following features, wherein performing the code and APIs consistency check to generate the code and APIs consistency assessment of the development code and the set of development APIs further comprises using a machine learning algorithm, and wherein the machine learning algorithm comprises at least one of a clustering algorithm or a supervised learning algorithm using a neural net.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a consistency assessment infrastructure (CAI), a user interface (UI) training request including at least a set of reference objects associated with a reference application, the set of reference objects including at least reference code including a set of reference UIs; training, by the CAI, a user interface behavior reference model (UIBRM) to generate a trained UIBRM by analyzing reference UI displays rendered on a browser by the reference application in response to interactions with the set of reference UIs; receiving, by the CAI, a UI display assessment request including at least a set of development objects associated with a development application, the set of development objects including at least development code including a set of development UIs; performing, by the CAI, a UI display assessment to generate an assessment of development UI displays by comparing the trained UIBRM to the development UI displays rendered on the browser by the development application in response to interactions with at least a subset of the set of development UIs; and sending, by the CAI, the assessment of development UI displays to a client system.

The foregoing and other described implementations can each, optionally, include one or more of the following features:

A first feature, combinable with any of the following features, wherein comparing the trained UIBRM to the development UI displays rendered on the browser further comprises: reading a pre-interaction UI image associated with a development UI display of the development UI displays rendered on the browser; recognizing UI elements of the development UI display using image recognition; comparing the trained UIBRM with the UI elements to generate a visual appearance and layout consistency assessment for the UI elements of the development UI display; sending at least one event to the browser to interact with at least one UI element of the UI elements, wherein the at least one event may comprise a mouse event, a keyboard event, or a touch event; reading a post-interaction UI image associated with the development UI display rendered on the browser by the development application after sending the at least one event to the browser; comparing the pre-interaction UI image to the post-interaction UI image using image recognition to determine navigation behavior results for the at least one UI element; and comparing the trained UIBRM with the navigation behavior results to generate a navigation behavior consistency assessment for the at least one UI element.

A second feature, combinable with any of the previous or following features, wherein the assessment of the development UI displays further comprises the visual appearance and layout consistency assessment for the UI elements of the development UI display and the navigation behavior consistency assessment for the at least one UI element of the development UI display.

A third feature, combinable with any of the previous or following features, further comprising: receiving a code and application programming interfaces (APIs) training request including at least the set of reference objects associated with the reference application, wherein the reference code further including a set of reference APIs, and wherein the set of reference objects further including at least a set of reference API definitions associated with the set of reference APIs; training a code reference model (CRM) to generate a trained CRM using the reference code and the set of reference API definitions; receiving a code and APIs consistency check request including at least the set of development objects associated with the development application, wherein the development code further including a set of developments APIs, and wherein the set of development objects further including at least a set of development API definitions associated with the set of development APIs; performing a code and APIs consistency check to generate a code and APIs consistency assessment of the development code and the set of development APIs by comparing the trained CRM to the development code and the set of development API definitions; and sending the code and APIs consistency assessment to the client system.

A fourth feature, combinable with any of the previous or following features, wherein performing the code and APIs consistency check further comprises: reading the development code to identify the set of development APIs; and reading the set of development API definitions to identify a set of API parameters from each development API of the set of development APIs, wherein comparing the trained CRM to the development code and the set of development API definitions further includes comparing the trained CRM to the set of API parameters from each development API of the set of development APIs.

A fifth feature, combinable with any of the previous or following features, wherein the set of API parameters from each development API includes at least one of an API type, an authentication definition, a pagination definition, and parameters in a header and a payload of the development API.

A sixth feature, combinable with any of the previous or following features, wherein performing the code and APIs consistency check to generate the code and APIs consistency assessment of the development code and the set of development APIs further comprises using a machine learning algorithm, and wherein the machine learning algorithm comprises at least one of a clustering algorithm or a supervised learning algorithm using a neural net.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touch screen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a consistency assessment infrastructure (CAI), a user interface (UI) training request including at least a set of reference objects associated with a reference application, the set of reference objects including at least reference code including a set of reference UIs;
   training, by the CAI, a user interface behavior reference model (UIBRM) to generate a trained UIBRM by analyzing reference UI displays rendered on a browser by the reference application in response to interactions with the set of reference UIs;
   receiving, by the CAI, a UI display assessment request including at least a set of development objects associated with a development application, the set of development objects including at least development code including a set of development UIs;
   performing, by the CAI, a UI display assessment to generate an assessment of development UI displays by comparing the trained UIBRM to the development UI displays rendered on the browser by the development application in response to interactions with at least a subset of the set of development UIs; and
   sending, by the CAI, the assessment of development UI displays to a client system.

2. The computer-implemented method of claim 1, wherein comparing the trained UIBRM to the development UI displays rendered on the browser further comprises:
   reading a pre-interaction UI image associated with a development UI display of the development UI displays rendered on the browser;
   recognizing UI elements of the development UI display using image recognition;
   comparing the trained UIBRM with the UI elements to generate a visual appearance and layout consistency assessment for the UI elements of the development UI display;
   sending at least one event to the browser to interact with at least one UI element of the UI elements, wherein the at least one event may comprise a mouse event, a keyboard event, or a touch event;
   reading a post-interaction UI image associated with the development UI display rendered on the browser by the development application after sending the at least one event to the browser;
   comparing the pre-interaction UI image to the post-interaction UI image using image recognition to determine navigation behavior results for the at least one UI element; and
   comparing the trained UIBRM with the navigation behavior results to generate a navigation behavior consistency assessment for the at least one UI element.

3. The computer-implemented method of claim 2, wherein the assessment of the development UI displays further comprises the visual appearance and layout consistency assessment for the UI elements of the development UI display and the navigation behavior consistency assessment for the at least one UI element of the development UI display.

4. The computer-implemented method of claim 1, further comprising:
   receiving a code and application programming interfaces (APIs) training request including at least the set of reference objects associated with the reference application, wherein the reference code further including a set of reference APIs, and wherein the set of reference objects further including at least a set of reference API definitions associated with the set of reference APIs;
   training a code reference model (CRM) to generate a trained CRM using the reference code and the set of reference API definitions;
   receiving a code and APIs consistency check request including at least the set of development objects associated with the development application, wherein the development code further including a set of developments APIs, and wherein the set of development objects further including at least a set of development API definitions associated with the set of development APIs;
   performing a code and APIs consistency check to generate a code and APIs consistency assessment of the development code and the set of development APIs by comparing the trained CRM to the development code and the set of development API definitions; and
   sending the code and APIs consistency assessment to the client system.

5. The computer-implemented method of claim 4, wherein performing the code and APIs consistency check further comprises:
   reading the development code to identify the set of development APIs; and
   reading the set of development API definitions to identify a set of API parameters from each development API of the set of development APIs, wherein comparing the trained CRM to the development code and the set of development API definitions further includes comparing the trained CRM to the set of API parameters from each development API of the set of development APIs.

6. The computer-implemented method of claim 5, wherein the set of API parameters from each development API includes at least one of an API type, an authentication definition, a pagination definition, and parameters in a header and a payload of the development API.

7. The computer-implemented method of claim 4, wherein performing the code and APIs consistency check to generate the code and APIs consistency assessment of the development code and the set of development APIs further comprises using a machine learning algorithm, and wherein the machine learning algorithm comprises at least one of a clustering algorithm or a supervised learning algorithm using a neural net.

8. A non-transitory, computer-readable medium storing one or more instructions executable by a computer system to perform operations comprising:
   receiving, by a consistency assessment infrastructure (CAI), a user interface (UI) training request including at least a set of reference objects associated with a reference application, the set of reference objects including at least reference code including a set of reference UIs;
   training, by the CAI, a user interface behavior reference model (UIBRM) to generate a trained UIBRM by analyzing reference UI displays rendered on a browser by the reference application in response to interactions with the set of reference UIs;
   receiving, by the CAI, a UI display assessment request including at least a set of development objects associated with a development application, the set of development objects including at least development code including a set of development UIs;
   performing, by the CAI, a UI display assessment to generate an assessment of development UI displays by comparing the trained UIBRM to the development UI displays rendered on the browser by the development application in response to interactions with at least a subset of the set of development UIs; and
   sending, by the CAI, the assessment of development UI displays to a client system.

9. The non-transitory, computer-readable medium of claim 8, wherein comparing the trained UIBRM to the development UI displays rendered on the browser further comprises:
   reading a pre-interaction UI image associated with a development UI display of the development UI displays rendered on the browser;
   recognizing UI elements of the development UI display using image recognition;
   comparing the trained UIBRM with the UI elements to generate a visual appearance and layout consistency assessment for the UI elements of the development UI display;
   sending at least one event to the browser to interact with at least one UI element of the UI elements, wherein the at least one event may comprise a mouse event, a keyboard event, or a touch event;
   reading a post-interaction UI image associated with the development UI display rendered on the browser by the development application after sending the at least one event to the browser;
   comparing the pre-interaction UI image to the post-interaction UI image using image recognition to determine navigation behavior results for the at least one UI element; and
   comparing the trained UIBRM with the navigation behavior results to generate a navigation behavior consistency assessment for the at least one UI element.

10. The non-transitory, computer-readable medium of claim 9, wherein the assessment of the development UI displays further comprises the visual appearance and layout consistency assessment for the UI elements of the development UI display and the navigation behavior consistency assessment for the at least one UI element of the development UI display.

11. The non-transitory, computer-readable medium of claim 8, further comprising:
   receiving a code and application programming interfaces (APIs) training request including at least the set of reference objects associated with the reference application, wherein the reference code further including a set of reference APIs, and wherein the set of reference objects further including at least a set of reference API definitions associated with the set of reference APIs;
   training a code reference model (CRM) to generate a trained CRM using the reference code and the set of reference API definitions;
   receiving a code and APIs consistency check request including at least the set of development objects associated with the development application, wherein the development code further including a set of developments APIs, and wherein the set of development objects further including at least a set of development API definitions associated with the set of development APIs;
   performing, by the CAI, a code and APIs consistency check to generate a code and APIs consistency assessment of the development code and the set of development APIs by comparing the trained CRM to the development code and the set of development API definitions; and
   sending the code and APIs consistency assessment to the client system.

12. The non-transitory, computer-readable medium of claim 11, wherein performing the code and APIs consistency check further comprises:
   reading the development code to identify the set of development APIs; and
   reading the set of development API definitions to identify a set of API parameters from each development API of the set of development APIs, wherein comparing the trained CRM to the development code and the set of development API definitions further includes comparing the trained CRM to the set of API parameters from each development API of the set of development APIs.

13. The non-transitory, computer-readable medium of claim 12, wherein the set of API parameters from each development API includes at least one of an API type, an authentication definition, a pagination definition, and parameters in a header and a payload of the development API.

14. The non-transitory, computer-readable medium of claim 11, wherein performing the code and APIs consistency check to generate the code and APIs consistency assessment of the development code and the set of development APIs further comprises using a machine learning algorithm, and wherein the machine learning algorithm comprises at least one of a clustering algorithm or a supervised learning algorithm using a neural net.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a consistency assessment infrastructure (CAI), a user interface (UI) training request including at least a set of reference objects associated with a reference application, the set of reference objects including at least reference code including a set of reference UIs;
      training, by the CAI, a user interface behavior reference model (UIBRM) to generate a trained UIBRM by analyzing reference UI displays rendered on a browser by the reference application in response to interactions with the set of reference UIs;

receiving, by the CAI, a UI display assessment request including at least a set of development objects associated with a development application, the set of development objects including at least development code including a set of development UIs;

performing, by the CAI, a UI display assessment to generate an assessment of development UI displays by comparing the trained UIBRM to the development UI displays rendered on the browser by the development application in response to interactions with at least a subset of the set of development UIs; and sending, by the CAI, the assessment of development UI displays to a client system.

16. The computer-implemented system of claim 15, wherein comparing the trained UIBRM to the development UI displays rendered on the browser further comprises:

reading a pre-interaction UI image associated with a development UI display of the development UI displays rendered on the browser;

recognizing UI elements of the development UI display using image recognition;

comparing the trained UIBRM with the UI elements to generate a visual appearance and layout consistency assessment for the UI elements of the development UI display;

sending at least one event to the browser to interact with at least one UI element of the UI elements, wherein the at least one event may comprise a mouse event, a keyboard event, or a touch event;

reading a post-interaction UI image associated with the development UI display rendered on the browser by the development application after sending the at least one event to the browser;

comparing the pre-interaction UI image to the post-interaction UI image using image recognition to determine navigation behavior results for the at least one UI element; and comparing the trained UIBRM with the navigation behavior results to generate a navigation behavior consistency assessment for the at least one UI element.

17. The computer-implemented system of claim 16, wherein the assessment of the development UI displays further comprises the visual appearance and layout consistency assessment for the UI elements of the development UI display and the navigation behavior consistency assessment for the at least one UI element of the development UI display.

18. The computer-implemented system of claim 15, further comprising:

receiving a code and application programming interfaces (APIs) training request including at least the set of reference objects associated with the reference application, wherein the reference code further including a set of reference APIs, and wherein the set of reference objects further including at least a set of reference API definitions associated with the set of reference APIs;

training a code reference model (CRM) to generate a trained CRM using the reference code and the set of reference API definitions;

receiving, by the CAI, a code and APIs consistency check request including at least the set of development objects associated with the development application, wherein the development code further including a set of developments APIs, and wherein the set of development objects further including at least a set of development API definitions associated with the set of development APIs; and performing, by the CAI, a code and APIs consistency check to generate a code and APIs consistency assessment of the development code and the set of development APIs by comparing the trained CRM to the development code and the set of development API definitions, wherein sending the assessment of development UI displays to the client system further includes sending the code and APIs consistency assessment to the client system.

19. The computer-implemented system of claim 18, wherein performing the code and APIs consistency check further comprises:

reading the development code to identify the set of development APIs; and reading the set of development API definitions to identify a set of API parameters from each development API of the set of development APIs, wherein comparing the trained CRM to the development code and the set of development API definitions further includes comparing the trained CRM to the set of API parameters from each development API of the set of development APIs.

20. The computer-implemented system of claim 19, wherein the set of API parameters from each development API includes at least one of an API type, an authentication definition, a pagination definition, and parameters in a header and a payload of the development API.

* * * * *